(12) United States Patent
Bond

(10) Patent No.: US 8,545,334 B2
(45) Date of Patent: *Oct. 1, 2013

(54) METHOD OF LINKING DEVICES TO GAMING MACHINES

(71) Applicant: Anthony Wayne Bond, Tucson, AZ (US)

(72) Inventor: Anthony Wayne Bond, Tucson, AZ (US)

(73) Assignee: Aristocrat Technologies Australia Pty Limited (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/625,576

(22) Filed: Sep. 24, 2012

(65) Prior Publication Data

US 2013/0079148 A1    Mar. 28, 2013

Related U.S. Application Data

(63) Continuation of application No. 11/093,935, filed on Mar. 30, 2005, now Pat. No. 8,298,085, which is a continuation of application No. 09/720,046, filed on Jul. 28, 2003, now Pat. No. 7,993,194, which is a continuation of application No. PCT/AU99/00500, filed on Jun. 18, 1999, now Pat. No. 7,993,194, which is a continuation of application No. 60/089,785, filed on Jun. 18, 1998.

(51) Int. Cl.
    *A63F 9/24* (2006.01)
    *A63F 13/00* (2006.01)

(52) U.S. Cl.
    USPC ........ 463/42; 463/1; 463/16; 463/20; 463/25; 463/29

(58) Field of Classification Search
    USPC .............................. 463/16, 20, 25, 29, 40–42
    See application file for complete search history.

(56) References Cited

U.S. PATENT DOCUMENTS

| | | | | |
|---|---|---|---|---|
| 5,497,479 | A * | 3/1996 | Hornbuckle | 463/29 |
| 5,577,735 | A * | 11/1996 | Reed et al. | 463/40 |
| 5,643,086 | A * | 7/1997 | Alcorn et al. | 463/29 |
| 5,644,704 | A * | 7/1997 | Pease et al. | 714/42 |
| 5,655,148 | A * | 8/1997 | Richman et al. | 710/8 |
| 5,790,753 | A * | 8/1998 | Krishnamoorthy et al. | 709/203 |
| 5,794,035 | A * | 8/1998 | Golub et al. | 718/104 |
| 5,809,251 | A * | 9/1998 | May et al. | 709/223 |
| 5,851,149 | A * | 12/1998 | Xidos et al. | 463/42 |
| 5,951,639 | A * | 9/1999 | MacInnis | 725/70 |
| 5,999,741 | A * | 12/1999 | May et al. | 717/173 |
| 6,044,471 | A * | 3/2000 | Colvin | 726/28 |
| 6,073,214 | A * | 6/2000 | Fawcett | 711/133 |
| 6,078,942 | A * | 6/2000 | Eisler et al. | 718/100 |
| 6,104,815 | A * | 8/2000 | Alcorn et al. | 380/251 |
| 6,134,601 | A * | 10/2000 | Spilo et al. | 719/328 |
| 6,219,836 | B1 * | 4/2001 | Wells et al. | 717/178 |
| 6,253,375 | B1 * | 6/2001 | Gordon et al. | 725/88 |
| 6,305,019 | B1 * | 10/2001 | Dyer et al. | 725/91 |
| 6,364,769 | B1 * | 4/2002 | Weiss et al. | 463/29 |

(Continued)

*Primary Examiner* — Dmitry Suhol
*Assistant Examiner* — Ryan Hsu
(74) *Attorney, Agent, or Firm* — McAndrews, Held & Malloy, Ltd.

(57) ABSTRACT

Gaming software interfaces to hardware through high level drivers loaded in resource repositories. The high level drivers can be software or hardware drivers. Software drivers can simulate hardware, connect to other parts of the gaming software, or combine functions by calling other software and hardware drives. New drivers can be added easily, allowing gaming software to use new hardware with little or no changes.

18 Claims, 21 Drawing Sheets

(56) References Cited

U.S. PATENT DOCUMENTS

| | | | |
|---|---|---|---|
| 6,488,585 B1 * | 12/2002 | Wells et al. | 463/43 |
| 6,682,423 B2 * | 1/2004 | Brosnan et al. | 463/29 |
| 6,704,864 B1 * | 3/2004 | Philyaw | 713/1 |
| 6,769,019 B2 * | 7/2004 | Ferguson | 709/219 |
| 6,805,634 B1 * | 10/2004 | Wells et al. | 463/42 |
| 6,968,405 B1 * | 11/2005 | Bond et al. | 710/72 |

* cited by examiner

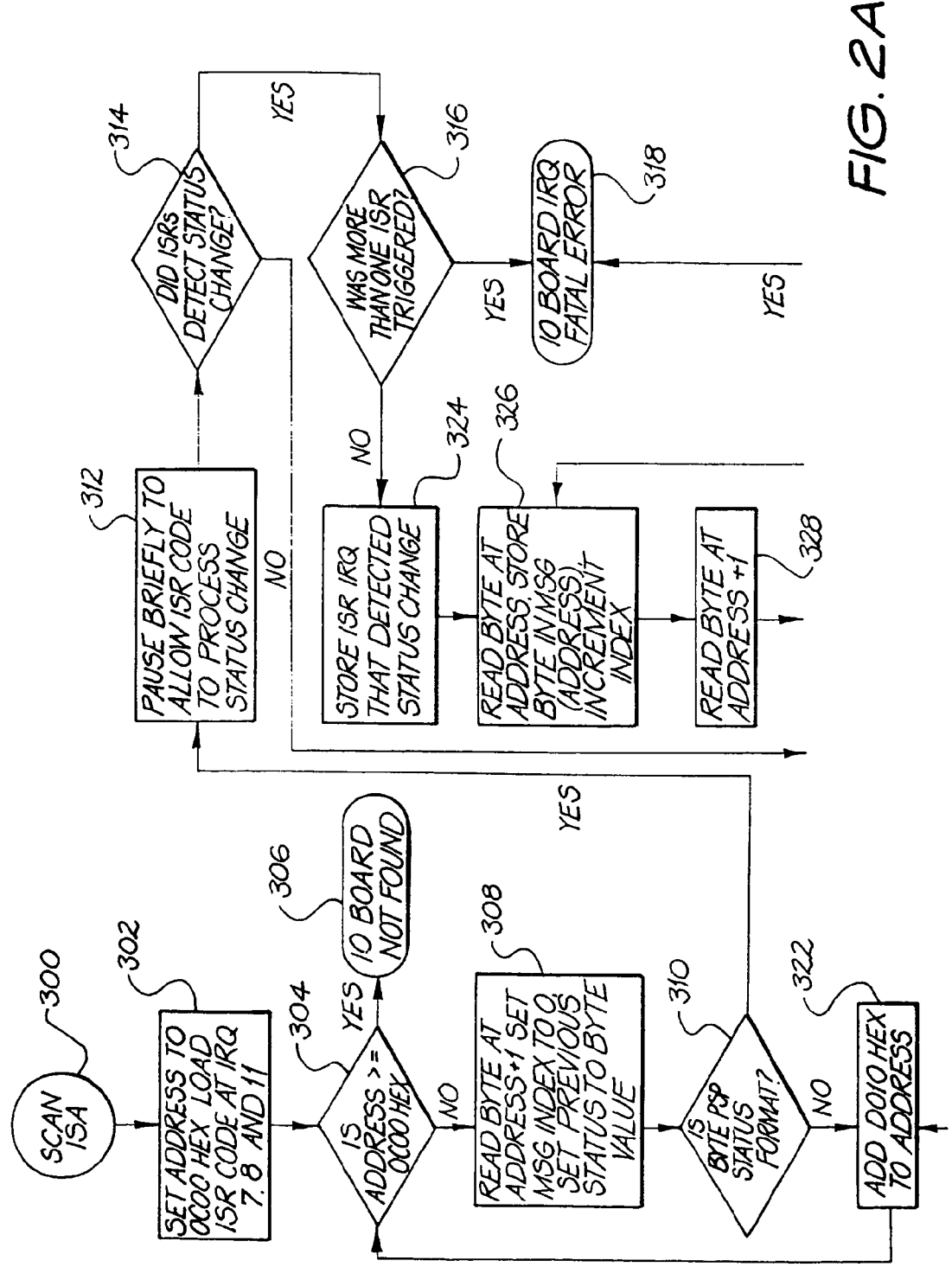

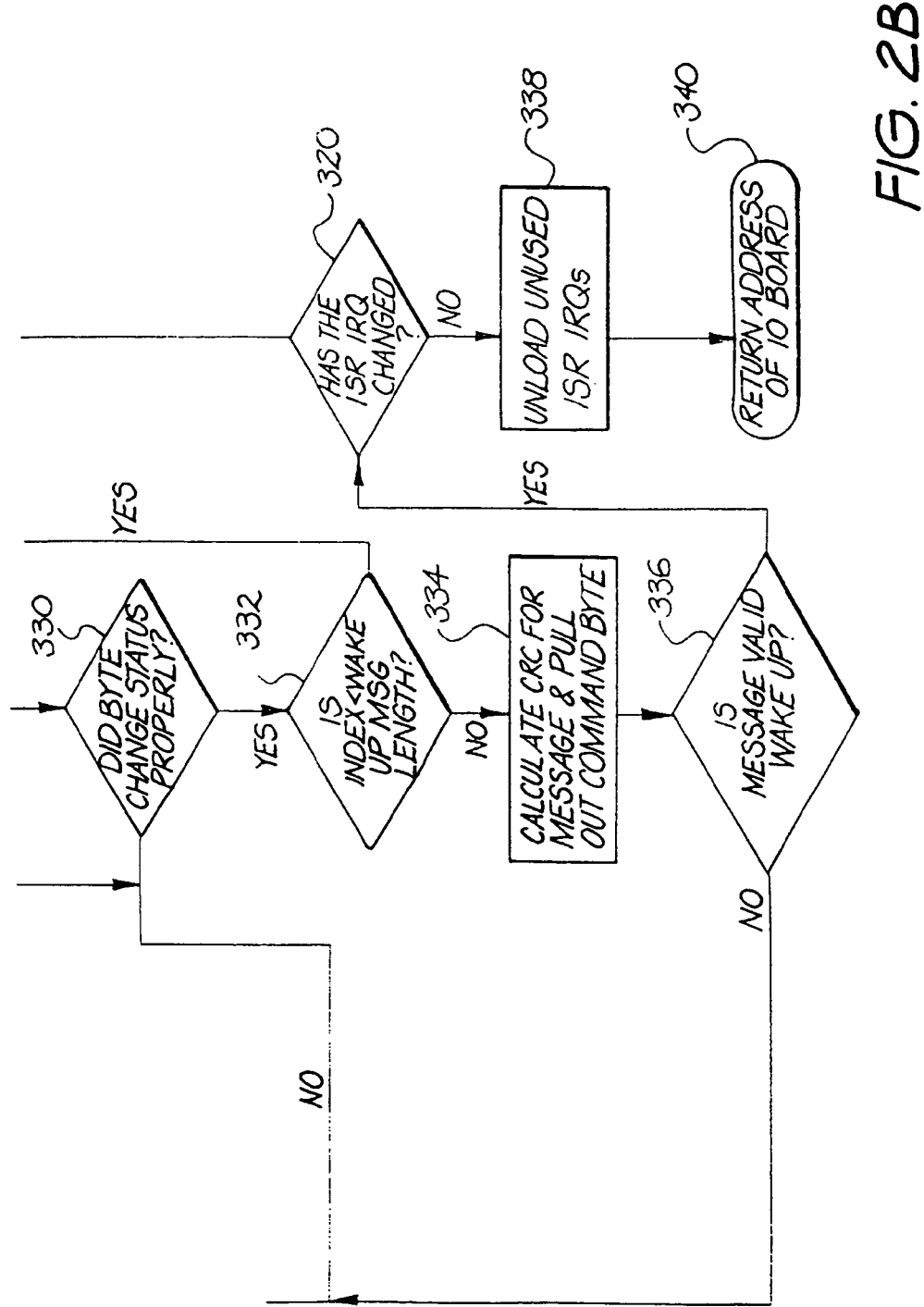

METHOD OF LINKING DEVICES TO GAMING MACHINES

The present invention is a method to link Input/Output ("I/O") devices such as gaming machine peripheral devices to gaming machines in such a manner that the gaming machine can determine, among other things, the number and types of devices connected, the prior use of the devices and ways of upgrading the devices without interfering with the operation of the gaming machine.

BACKGROUND OF THE INVENTION

Historically, gaming machines have always been monolithic. That is, they have a single central processing unit (CPU) running a single block of software and/or firmware that controlled all the hardware directly. Some hardware devices have a micro-controller in them to perform tasks for an explicit hardware function, but the game CPU to hardware interface is still monolithic in nature. An example of two smart devices that are controlled by the single game CPU are the following: U.S. Pat. No. 5,190,495 to Taxon and assigned to Bally Manufacturing Corp. for a high capacity coin hopper for a gaming machine, which uses traditional control lines as if it were a non-intelligent hopper. U.S. Pat. No. 5,420,406 to Izawa et al, and assigned to Japan Cash Machine Co., Ltd., which discloses a bill acceptor that requires a micro-controller to perform the operation of validating currency, but is interfaced via a dedicated serial port. The software to talk to these hardware devices would, generally, always be included in the software block that runs on the game CPU, whether or not that device was connected to the game. This static approach affects the CPU layout, since the input/output (I/O) is included on the CPU board, and it affects the design of the software that runs on the CPU. The resulting method of integrating the software to the hardware on a monolithic CPU makes the software monolithic, harder to add new interfaces to hardware and harder to maintain existing code. By adding an extra level of intelligence to the hardware devices to allow them to be abstracted, such as in NuGame's U.S. Patent Application 0015 1 973 992 4643, for an I/O Interface and Device Abstraction, filed 24 Jul., 1998, the software (which runs on the game CPU) can be modified to allow for dynamic hardware connections. This extra level of intelligence permits the developer to write interfacing software modules that are both smaller and easier to debug and maintain. In addition, properly abstracted hardware can be hot-swapped since the software will automatically load the right driver and make the connection to the new hardware.

SUMMARY OF THE INVENTION

It is an object of the present invention to provide a method to dynamically link a gaming machine to an I/O communications driver and to communicate with an intelligent I/O board or control system.

Still another object of the present invention is to provide a method for dynamically linking a gaming machine to hardware that can connect a plurality of I/O boards.

Still another object of the present invention is to provide a method by which a gaming machine automatically scans the system for the presence of input/output devices.

Still another object of the present invention is to provide a method for a gaming machine that can detect the presence of additional input/output devices attached to the gaming machine.

Still another object of the present invention is to provide a method that easily allows new hardware to be added to a gaming machine.

Still another object of the present invention is to provide a method by which any of the input/output devices can be connected to the gaming machine using any connection method, such as Industry Standard Architecture ("ISA") bus, Universal Serial Bus ("USB") port, or IEEE 1394 "Firewire".

Still another object of the present invention is to provide a method by which the configuration of the hardware connected to the gaming machine can be easily changed.

Still another object of the invention is to provide a method by which the configuration of the hardware connected to the gaming machine can be easily changed with little or no effect on the player's interaction with the game.

Still another object of the present invention to provide a method by which the gaming machine can still operate even though hardware is removed without turning off the gaming machine.

Still another object of the present invention to provide a method for dynamically linking hardware such as hoppers, printers, coin acceptors, diverters, reel stopper devices, bill acceptors, card readers, progressive displays, buttons, lamps, bells, lights, key switches, or any other input or output devices used in gaining to a gaming machine.

Still another object of the present invention is to provide a method by which the permanent storage media of a gaming machine may be relocated without affecting the gaming software.

Still another object of the present invention is to provide a method by which the manager or drivers of the system may be updated easily without affecting the operation of the gaming software.

Still another object of the present invention is to provide a method by which the manager or drivers of the system may be updated easily from a central location without affecting the operation of gaming software.

Still another object of the present invention is to provide a method by which the operation of the gaming machine may be modified by the addition of software drivers.

Still another object of the present invention is to provide a method to substitute for hardware using software drivers.

Still another object of the present invention is to intelligently change the usage of the software and hardware (through the use of software and hardware drivers) to create new modalities of interaction.

BRIEF DESCRIPTION OF THE DRAWINGS

The invention will be better understood by a Detailed Description of the Preferred Embodiment with reference to the Drawings of which:

FIGS. 2A and 2B (collectively, "FIG. 2") is a flowchart for the I/O communication driver to scan for the presence of the I/O control board;

DETAILED DESCRIPTION OF THE PREFERRED EMBODIMENTS

Referring now to the Figures, wherein like numerals reflect like elements, a method to dynamically link abstracted devices (i.e., hardware) used in, by, or for, gaming machines such as a slot machine to gaming software is disclosed.

The method, in its preferred embodiment contains a resource manager comprising six functional blocks, namely:

(1) a Resource Manager Control Task 20;
(2) an I/O Communication Driver 30;
(3) a Low Level Driver Manager 40;
(4) a High Level Driver Manager 50;
(5) Driver Pools 60 and 70 and
(6) Resource Repositories 80, 90, 100.

Figure 1A:
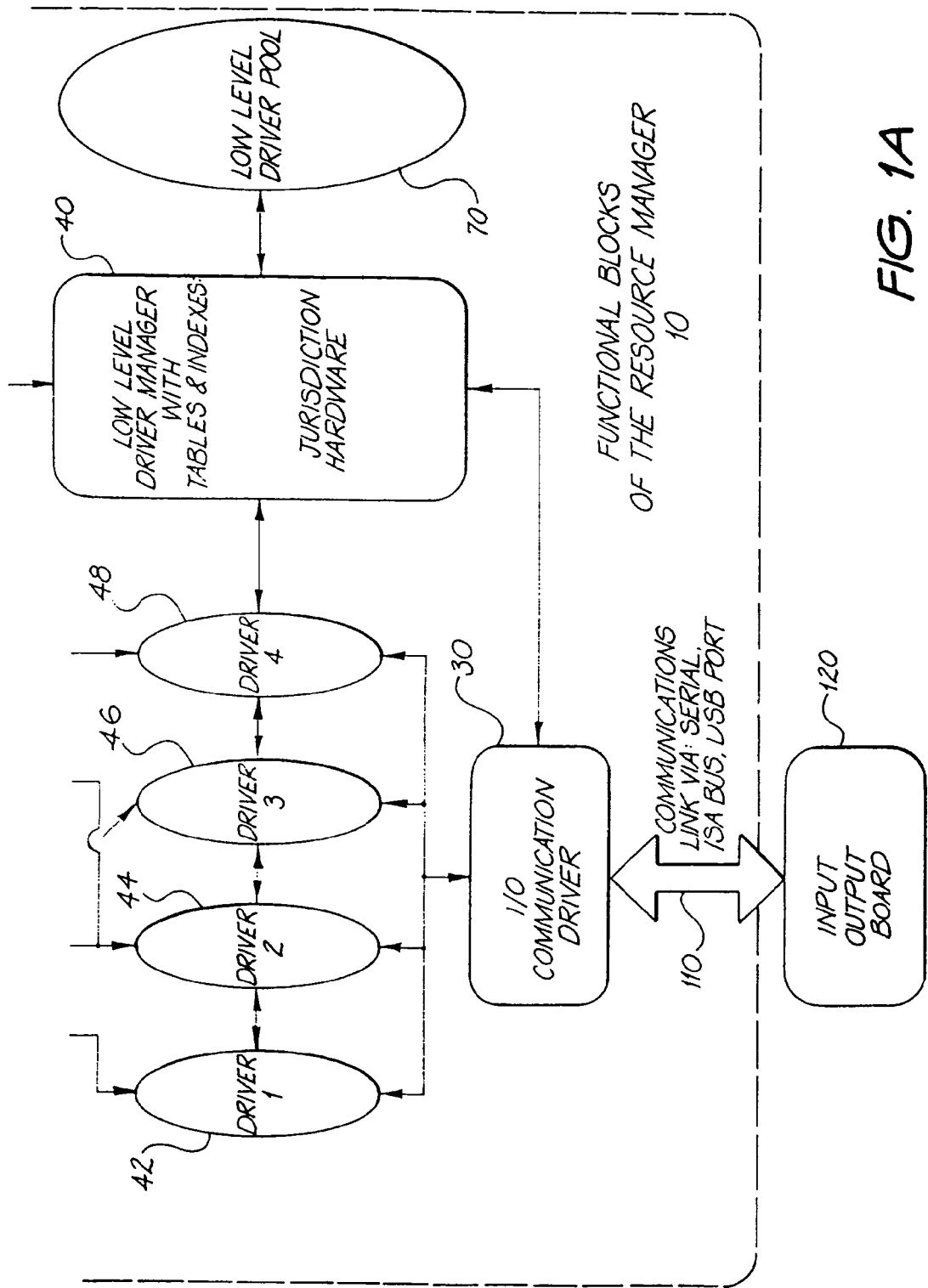
FIGS. 1A and 1B (collectively, "FIG. 1") is a block diagram of the resource manager functions.
Figure 1B:
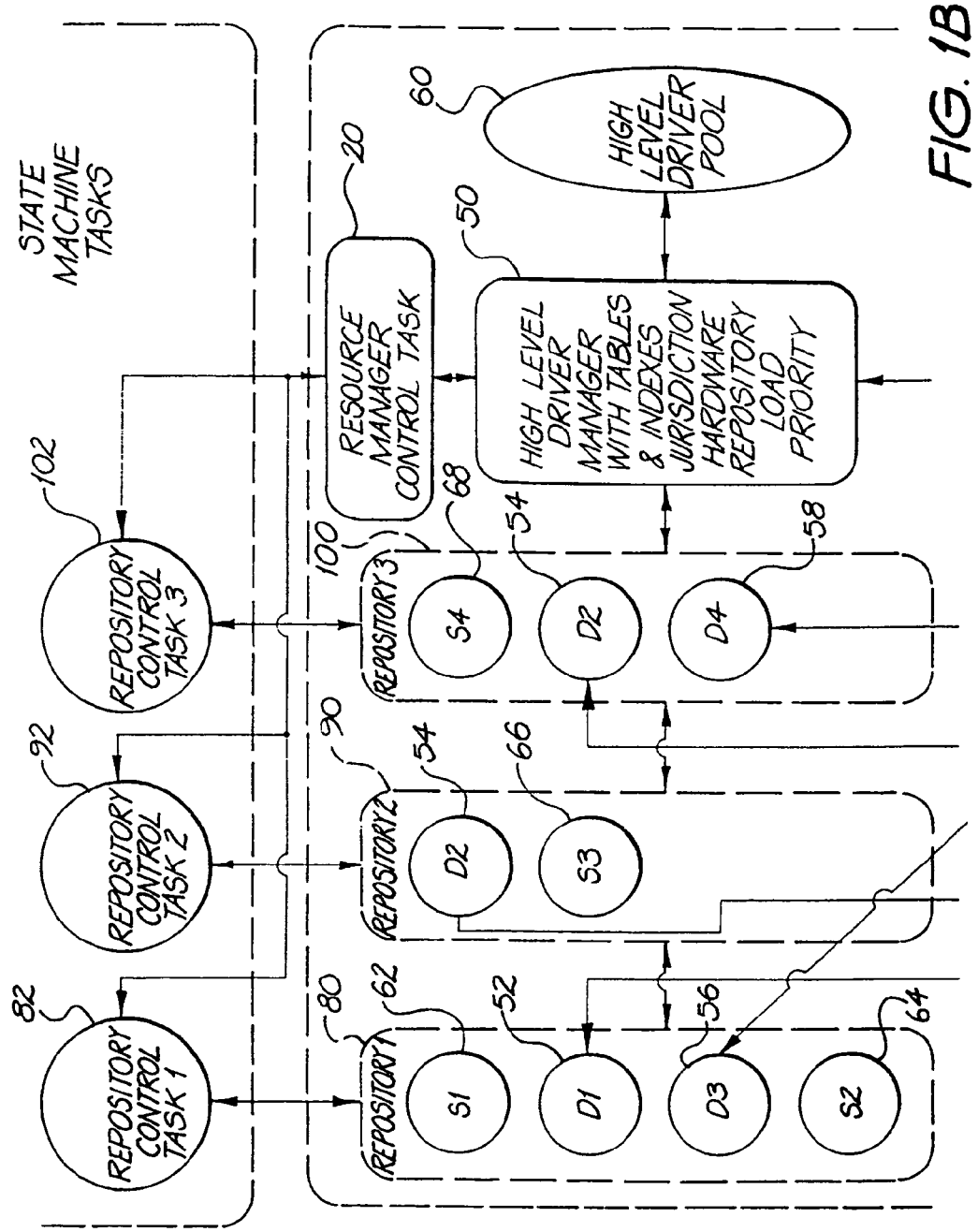

Referring to FIG. 1, the Resource Manager Control Task 20 is the command and control interface for the Game System. It also controls the update and configuration of the drivers and resource manager itself. The I/O Communication Driver 30 is the task that actually initiates and maintains the communication link to the Input/Output Control Board (IOCB) 120.

A detailed description of the IOCB is found in NuGame's patent application Ser. No. 60/085,892 for an Intelligent Input/Output Control System, filed 18 May, 1998. The Low Level Driver Manager 40 loads drivers, 42-48, that are allowed in the configured jurisdiction, for the hardware that the IOCB reports as being available. The High Level Driver manager 50 loads two different types of drivers:

(1) High Level Device Drivers 52, 54, 56, 58 as shown in FIG. 1; and
(2) High Level Software Drivers 62, 64, 66, 68.

High Level Device Drivers connect to their Low Level Device Driver counterpart as shown in FIG. 1. There can be many High Level Device Drivers connected to one Low Level Driver. Each of the Device Driver Managers has a Jurisdiction Error table built into it. This table will tell the Driver Manager 50 whether to ignore, warn about, tilt lockup allowing operator override or fatal tilt on columns of different error occurrences. There are also Driver Pools 70 and 60 associated with each Driver Manager 40 and 50 respectively. These contain the drivers that are available to each of the Driver Managers. The Driver Pools 70 and 60, using a relational index and table based on jurisdiction, and device type, allow the Driver Managers to find the proper driver to load. A second index for each driver based on revision levels will tell if the driver revision level can work with the hardware revision level. The High Level Drivers are loaded from Repositories 80, 90 and 100.

Repositories such as Repository 1 80 in FIG. 1 are groups of High Level Drivers, both software and hardware, that are of the same category and are controlled by system level tasks such as 82. The Repository Controlling Task 82, 92, 102 is the interface between the system and the hardware drivers of the resource manager. There are three types of Repositories: (1) Prioritized, (2) General, and (3) Unknown. Each prioritized Repository deals with only one type of object and they can thus be organized into a preferred utilization order. (Gaming software examples of Prioritized Repositories would be: "Bet", "Pay" and "Collect".)

General Repositories are groups of drivers that could apply to many different unrelated types of object, but are kept in a localized group to allow easy access. ("Game Interface" would be an example of a General Repository.)

Although not shown in the Figures, Repository, some examples of drivers in the "Game Interface" would be: buttons, reel motor controller, bonus token hoppers, meters, progressive, display, tower, bell and secondary game features. Unknown Repositories are Repositories requested to be created by Repository Controlling Tasks that are not in the High Level Driver Manager's table of Jurisdiction and Repositories. In the Unknown Repository case, The Repository Controlling Task, of the state machine, must request all operations on it explicitly.

Other types of devices that may be connected to the gaming machine include (but are not to be limited to), hoppers, printers, coin acceptors, diverters, reel stopper devices, bill acceptors, card readers, credit or debit or smart card readers, progressive displays, buttons, lamps, button lamps, bells, jackpot bells, lights, key switches or other devices known to those skilled in the art.

On power up, the game software starts the Resource Manager Control Task. The game software waits for the Resource Manager to send the location of the game's non-volatile (referred to as "NV") storage. If an error occurs, then there is a problem in either communicating with the IOCB, or the configuration of the IOCB. After the Resource Manager Control Task has initialized, the I/O communication driver attempts to find the primary IOCB. If the IOCB is plugged into the Industry Standard Architecture (ISA) bus then the I/O communication drivers would query starting at 0C00 hex 302 skipping every 16 bytes up to 0D00 hex 304 until the IOCB is found at 340. In the preferred embodiment, the gaming machine used with the present invention includes a CPU manufactured by Intel Corp. as specified in NuGame's Patent Application Ser. No. 60/094,068 for an I/O Interface and Device Abstraction, filed 24 Jul., 1998.

In the arrangement of the IOCB on the ISA bus, there are two registers in the I/O memory address space. The first register is a message port for data packets to go back and forth between the CPU and IOCB 120. The second register is an I/O port status register. This register tells the CPU if there are any message data bytes to be read, if the IOCB is ready to receive any message data bytes and whether the last message data byte has been read. At any time that the IOCB 120 makes a change to the status register, the IOCB 120 will also trigger an Interrupt Request ("IRQ") line on the ISA bus. The IOCB 120 can be configured to use any available IRQ lines, but will generally use IRQs 7, 8 or 11. Any secondary of tertiary IOCB in the game must use the same IRQ as the primary IOCB; otherwise an error will be generated.

The I/O communication driver 30 will load au Interrupt Service Routine ("ISR") at IRQs 7, 8 and 11. Starting at base I/O address 0C00 hex, the I/O driver reads a byte at I/O address base plus one, to see if it could be the IOCB status register. If the byte read is the status register, the bits will be a unique Pattern 314 as specified in NuGame's Patent Application Ser. No. 60/094,068, filed 24 Jul., 1998 for an I/O Interface and Abstraction.

If there is no port at the address at all, the bus read returns FF hex. Only if the byte read is likely to be the status register will the I/O driver then try to read a message from IOCB message port at base I/O address, 0C00 hex. If the IOCB is there at 312, the status register is updated and an interrupt is triggered via the IOCB configured IRQ line at 314. If more than one IRQ based ISR detects an interrupt for the change, the I/O communication driver will issue a fatal tilt message at 316, 318 stating there are multiple IOCB IRQs. If no ISR detects an interrupt at 314, the I/O communication driver will skip to the next address at 322. If the status register is okay and one ISR detected the change, the I/O communication driver will attempt to read the data port for a message. If the message is not valid, but the status register is operating properly at 330, changing bits to show another byte ready to read at 332, the I/O driver will continue to read the message port as shown in FIG. 2 until it times out after thirty seconds.

If the message packages have been corrupted in any way because they don't conform to the I/O Interface Protocol at 336, but the status register was working properly, the I/O driver stops scanning and goes to the next port address to be tried at 322. If the status register read was not a pattern allowed for the IOCB at 330, the driver will add 16 to the base address, now 0C10 hex, and try reading base I/O address plus one, 0C11 hex returning to 304, 308, etc., for the status register and so on until 0D00 hex. If the I/O driver has not found the IOCB in scanning the I/O memory address spaces between ranges 0C00 hex and 0D00 hex, the I/O communication driver will issue a fatal tilt message stating no IOCB found. If the message received at 334 was a "link request" message with a correct Cyclic Redundancy Code ("CRC") and command code shown at 336, and if the ISR IRQ detected has always been the same one, at 320 the I/O driver will unload the other two ISR at 338. If the ISR IRQ has changed at 320 to 318 the I/O driver will issue a fatal tilt stating the IOCB IRQ changed during scan. (See FIG. 2b).

Once the I/O communications driver 30 establishes a connection to an IOCB, during the scan for the presence of an IOCB, the resource manager controlling task 20 goes to the next phase. The first IOCB found during is labeled the primary IOCB. There could be zero, one, or two additional IOCBs connected to the game CPU. As described in NuGame's patent application for an Intelligent Input/Output Control System, Ser. No. 60/085,892, filed 18 May, 1998. In the "USB" and "Firewire" protocols, the IOCB's would be daisy chained on the respective media. In the case of an ISA interface, the IOCB, would each plug directly into the bus like a PC "ISA" card, or a PC-104 card (used in embedded systems to plug into the ISA bus), or a PC-104+"PCI Bus" card.

Once reliable communications have been established between the I/O communication driver 30 and IOCB 120, the I/O communication driver 30 requests the primary configuration data from the primary IOCB. The primary configuration data is passed on to the resource manager control task 20 for evaluation. (See FIG. 3.). This data contains the jurisdiction for this game, the interface type and address of any secondary IOCBs, and the type and address of the primary, secondary, and tertiary non-volatile storage. The configuration data block has a CRC signature which is checked to insure the data is valid, as shown from points 440 through 450. If the CRC does not match the recorded block CRC for that device, the primary IOCB's configuration is not valid. This results in a fatal tilt message being issued stating that the primary IOCB configuration data failed the CRC check. The next thing checked is the jurisdiction entry at 446. If the resource manager control task 20 does not recognize the jurisdiction at 446 and 448, from a table of known jurisdictions, a fatal tilt message is issued stating that the jurisdiction configuration data has an invalid jurisdiction.

Figure 3:
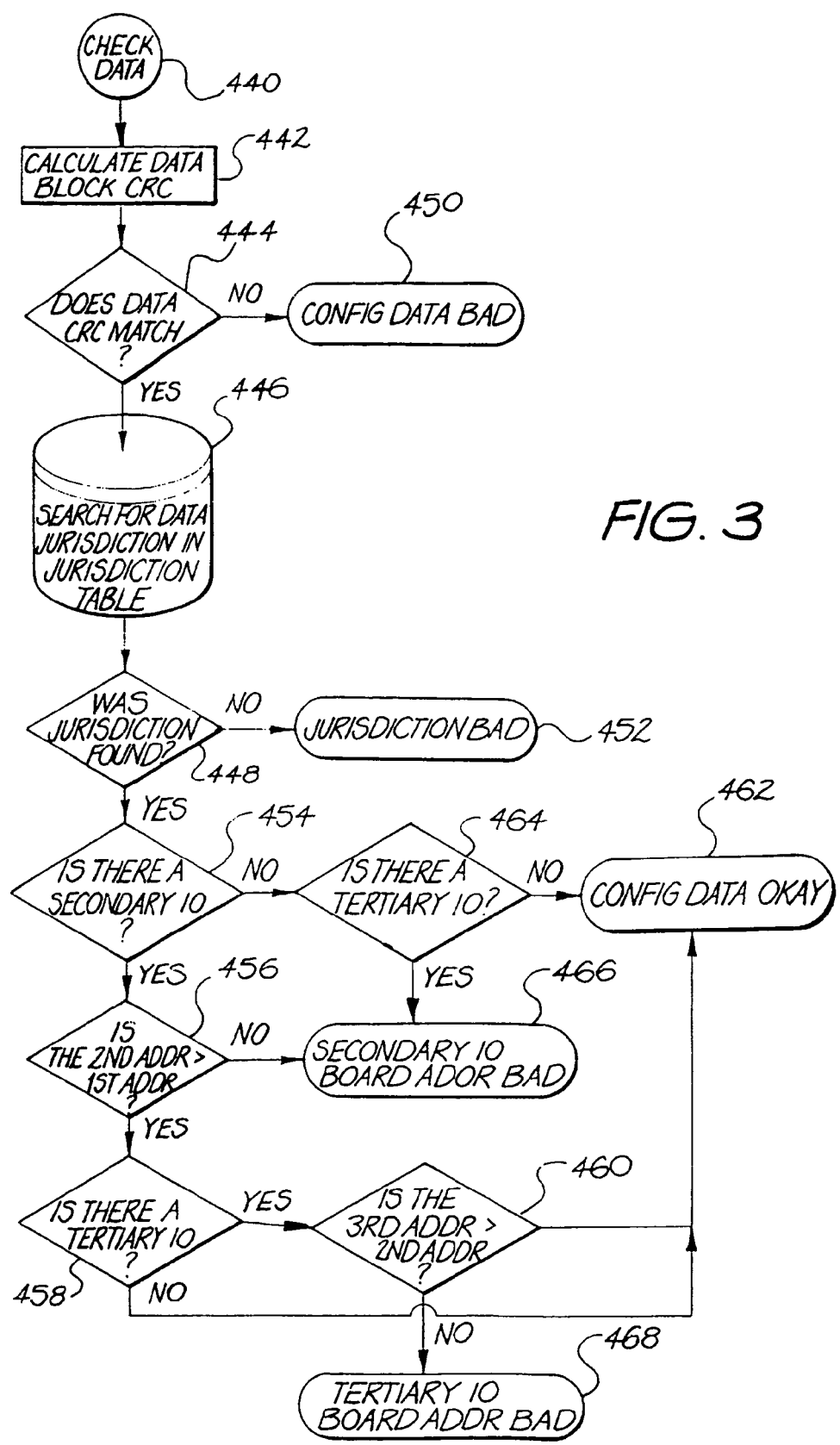
FIG. 3 is the flowchart for the verification of the address of the secondary and tertiary IOCBs.
Figure 4A:
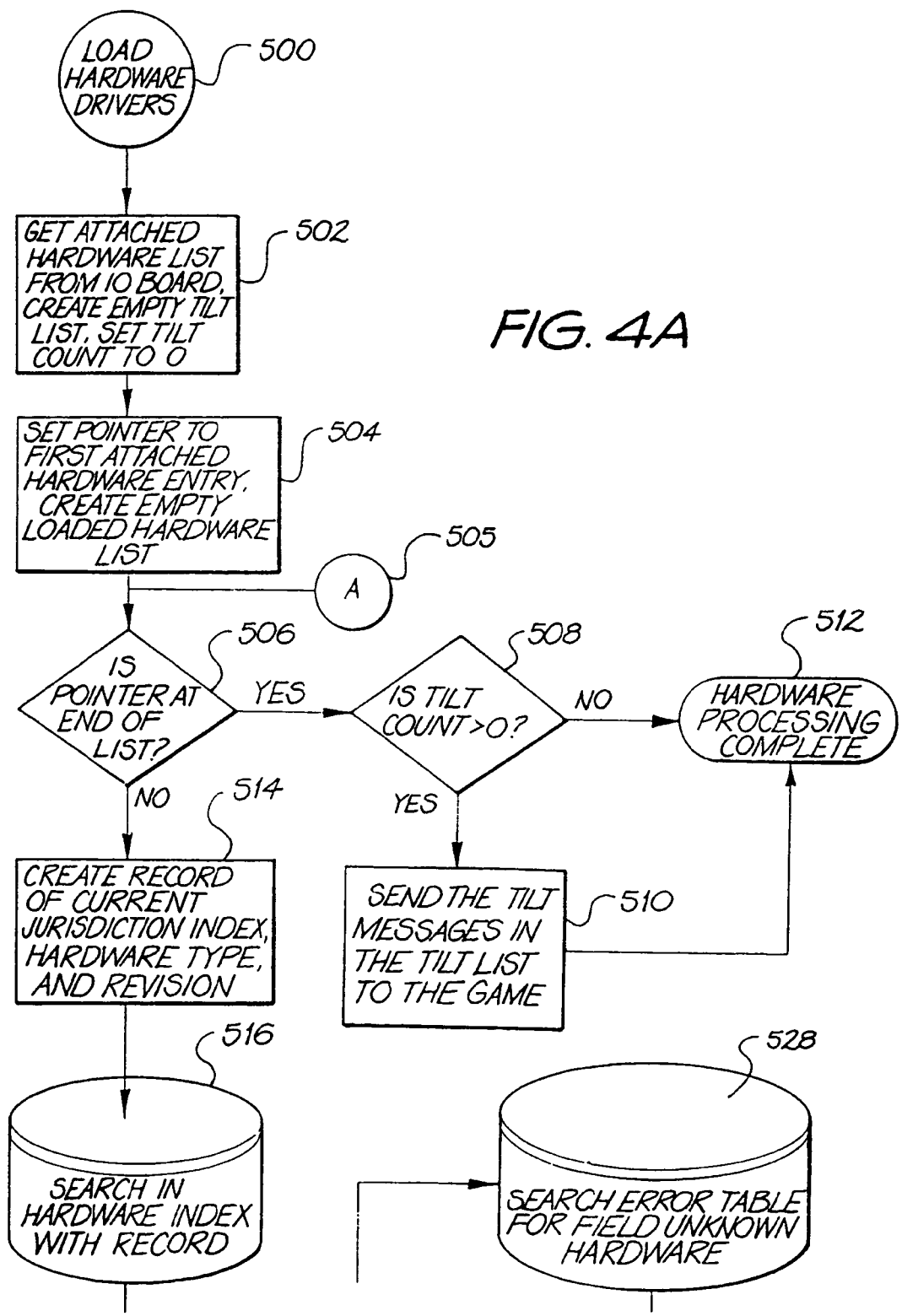
FIGS. 4A, 4B, 4C, 4D, 4E and 4F (collectively, "FIG. 4") is the flowchart of the Low Level Driver Manager loading drivers for attached hardware.
Figure 4B:
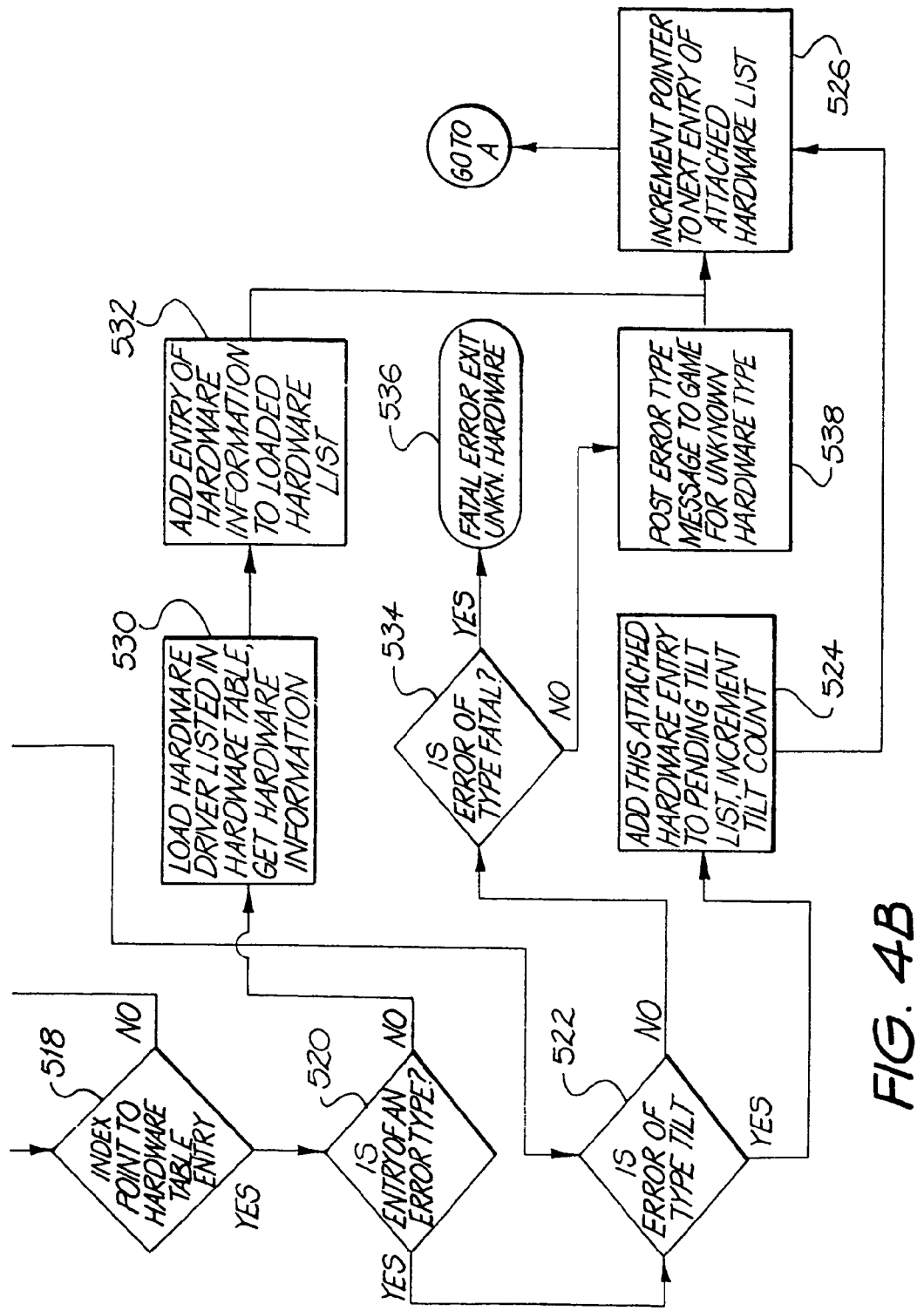
Figure 4C:
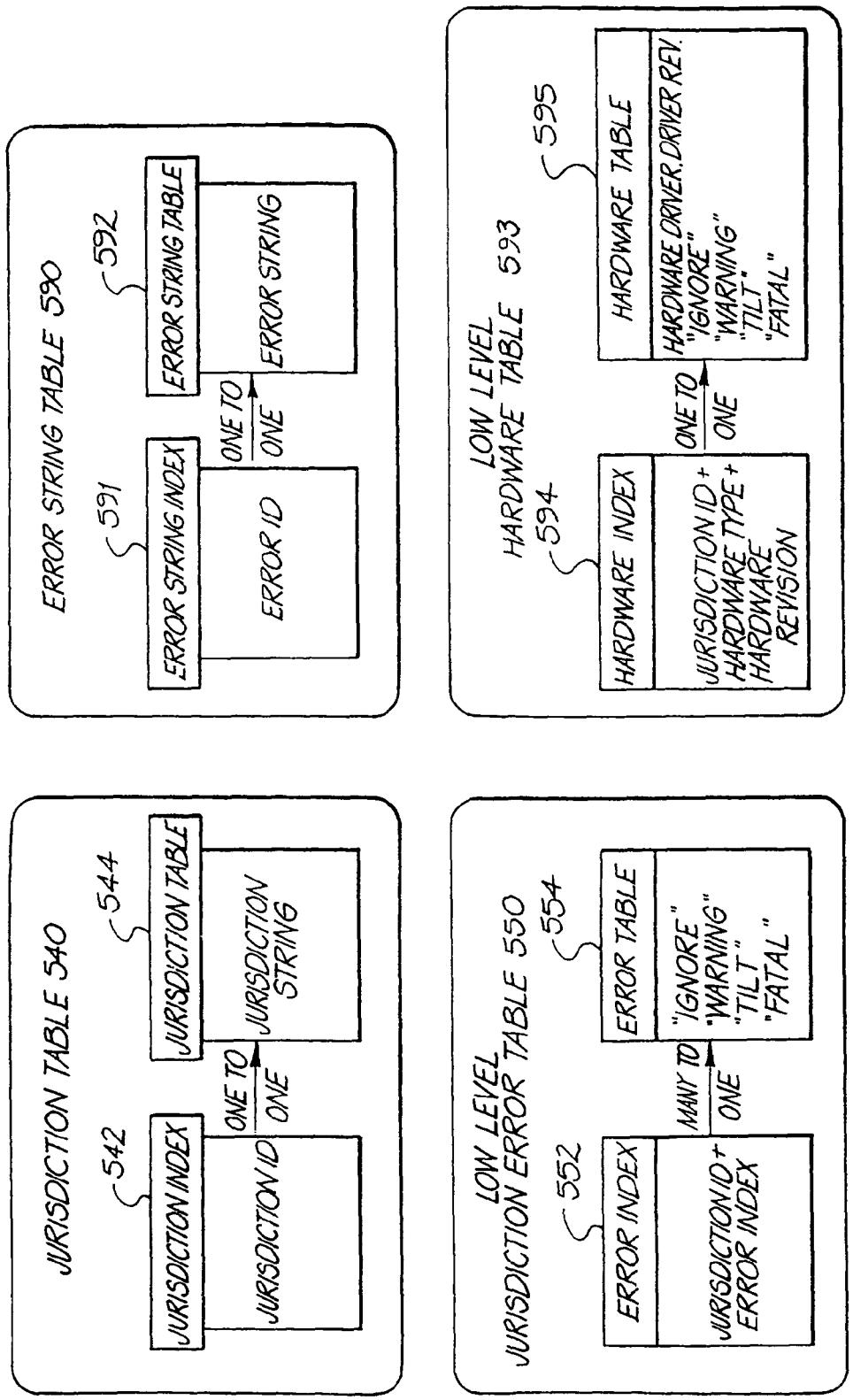
Figure 4D:
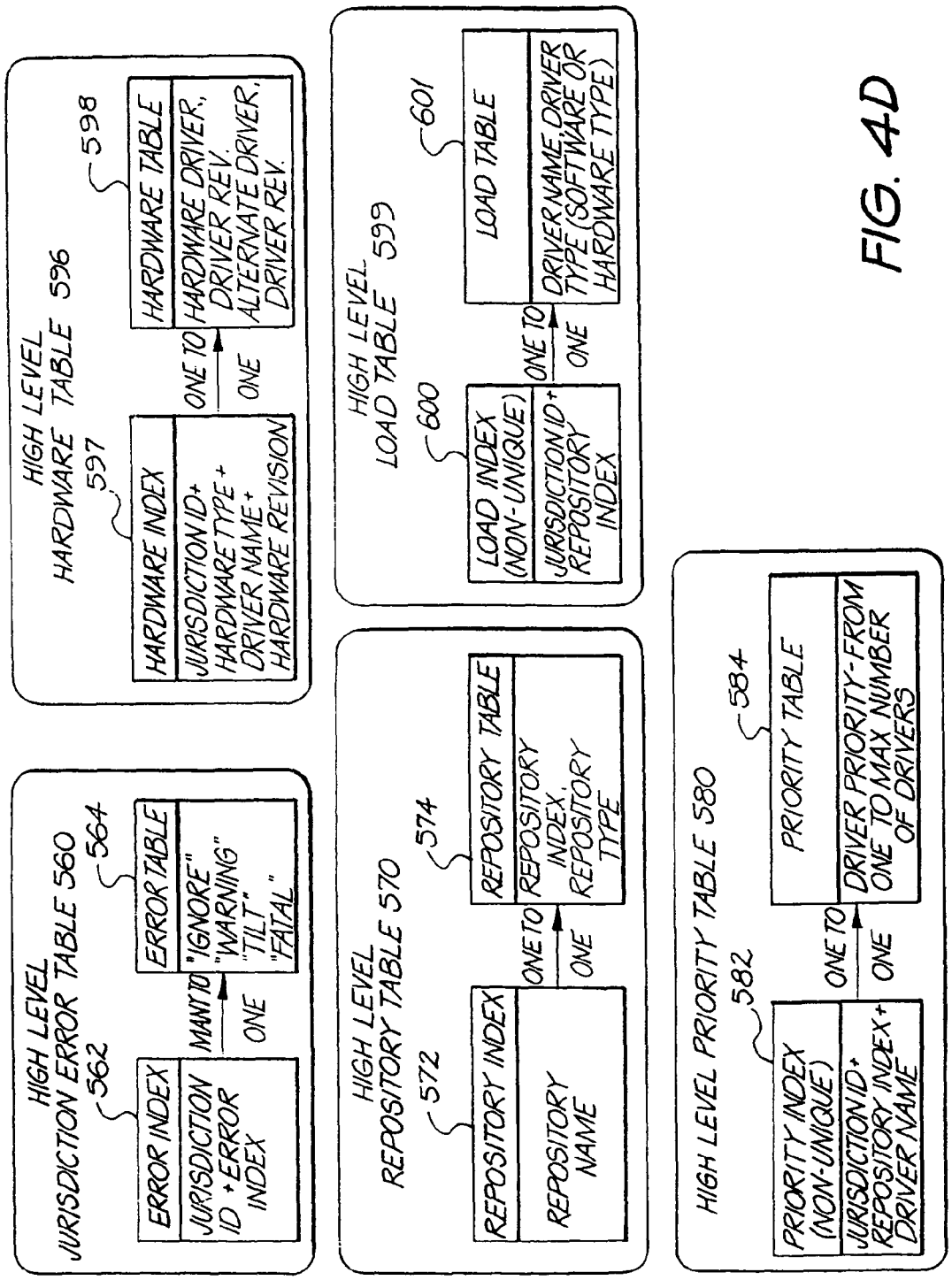
Figure 4E:
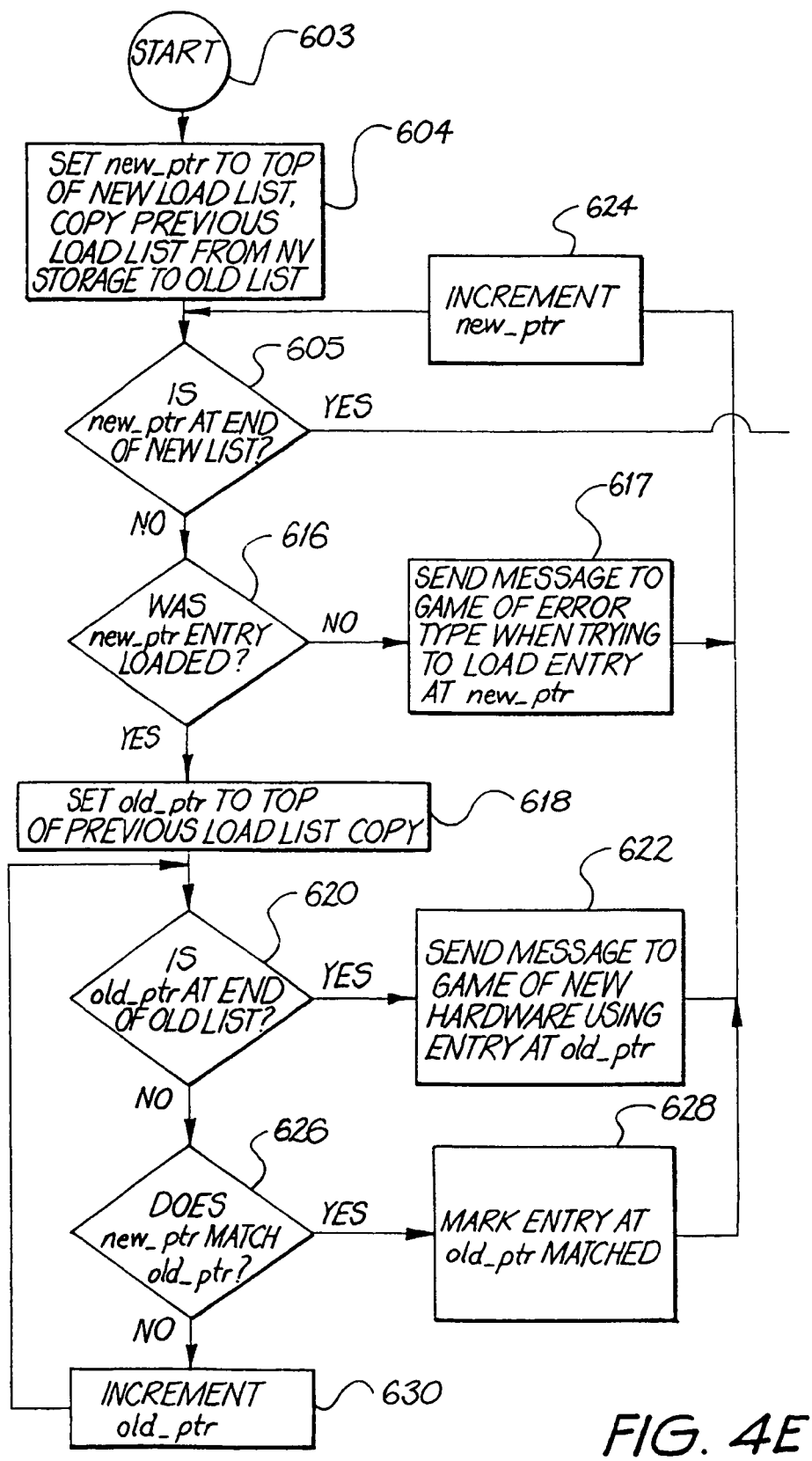
Figure 4F:
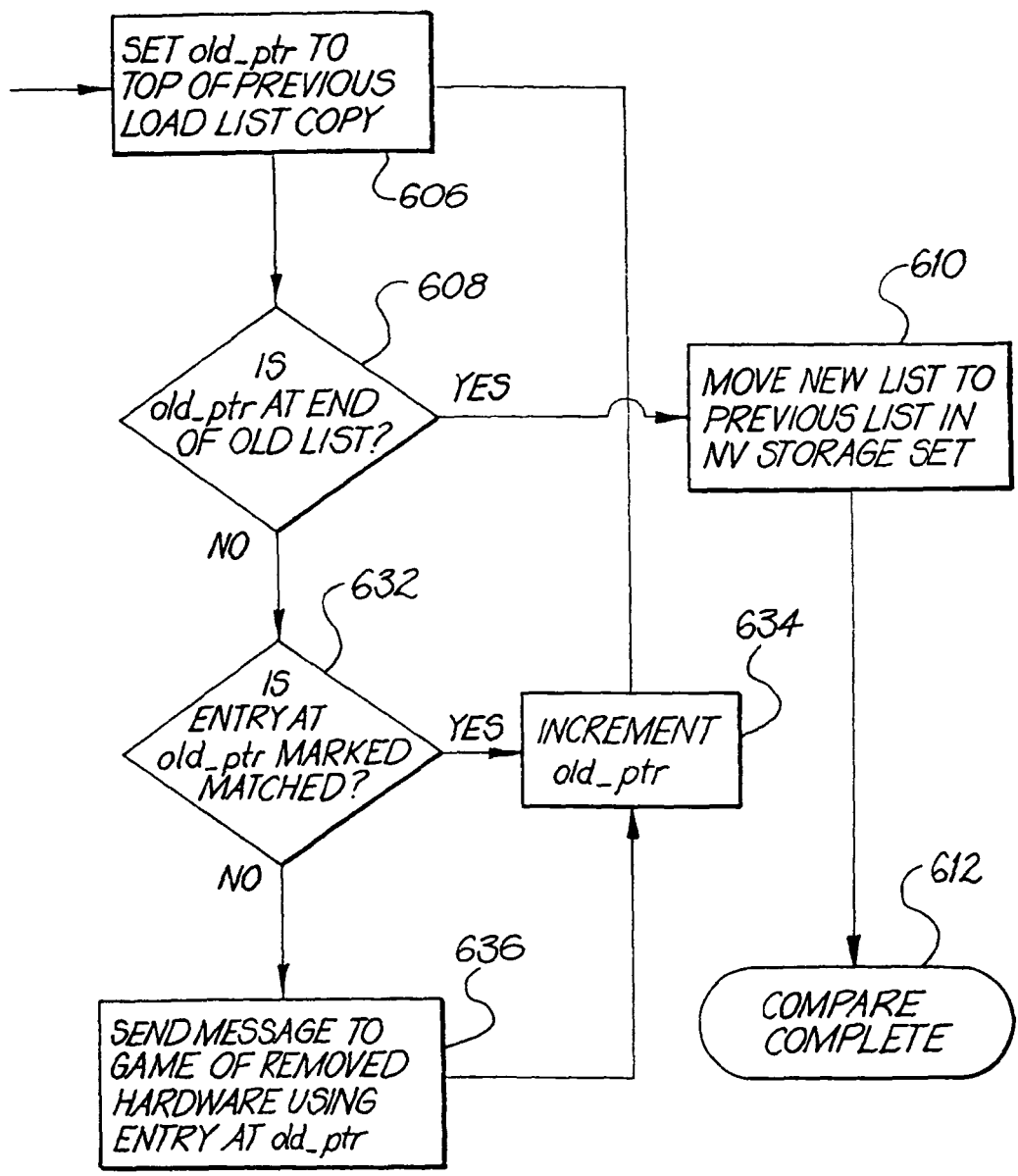
Figure 5A:
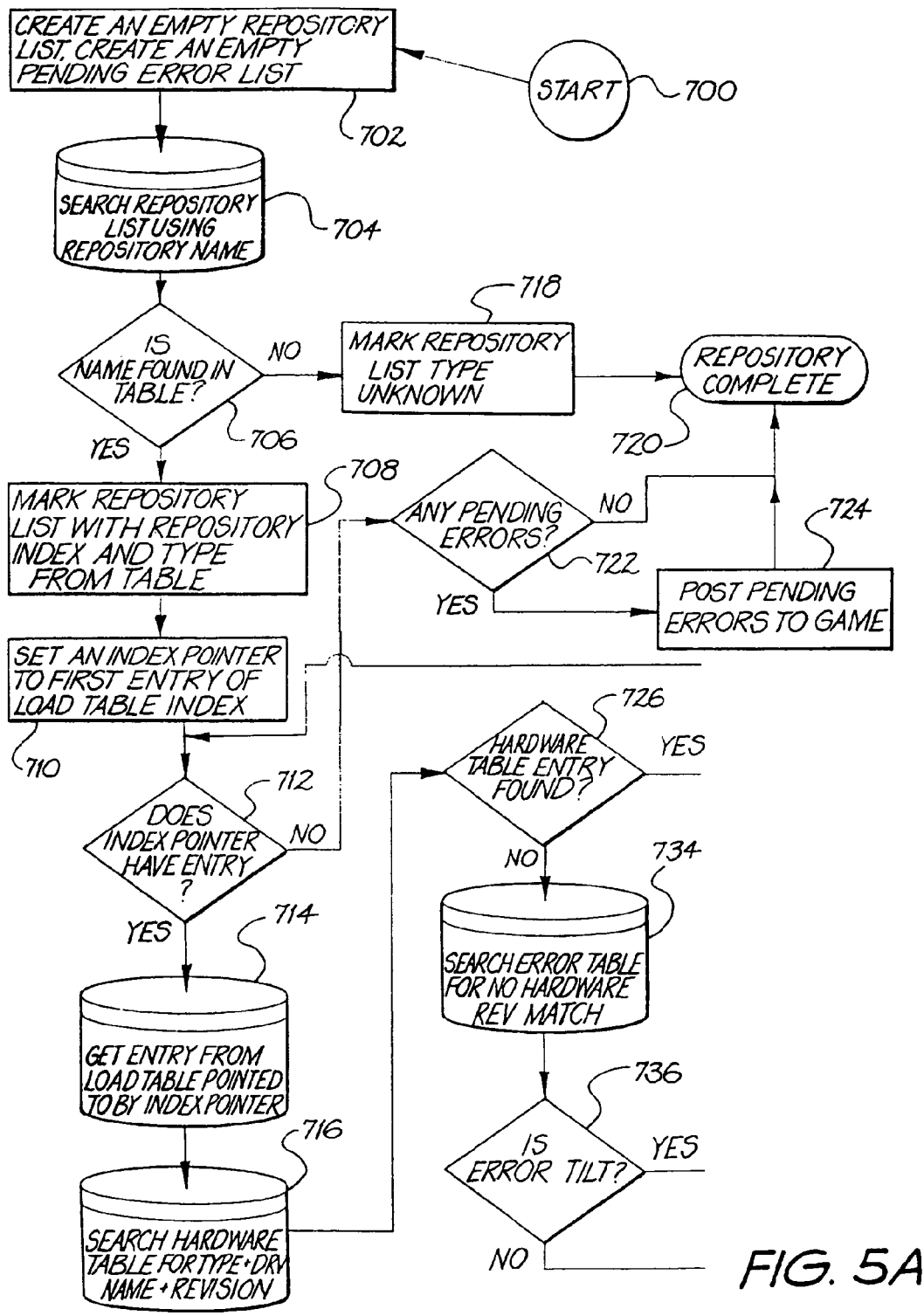
FIGS. 5A, 5B, 5C and 5D (collectively, "FIG. 5") is the flowchart of the High Level Driver Manager fielding requests for Repository creation, and then loading the default configured High Level Drivers based on jurisdiction and repository.
Figure 5B:
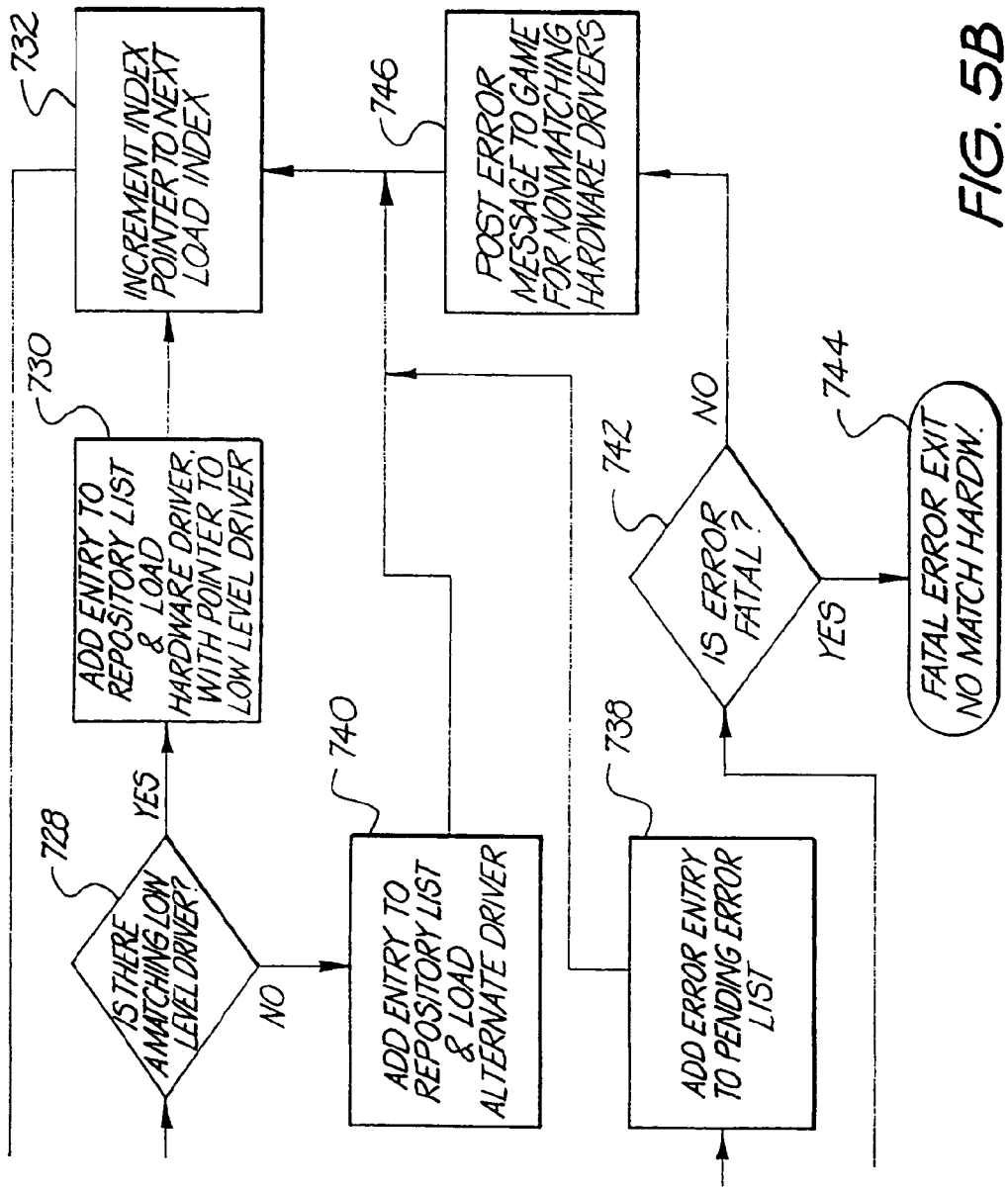
Figure 5C:
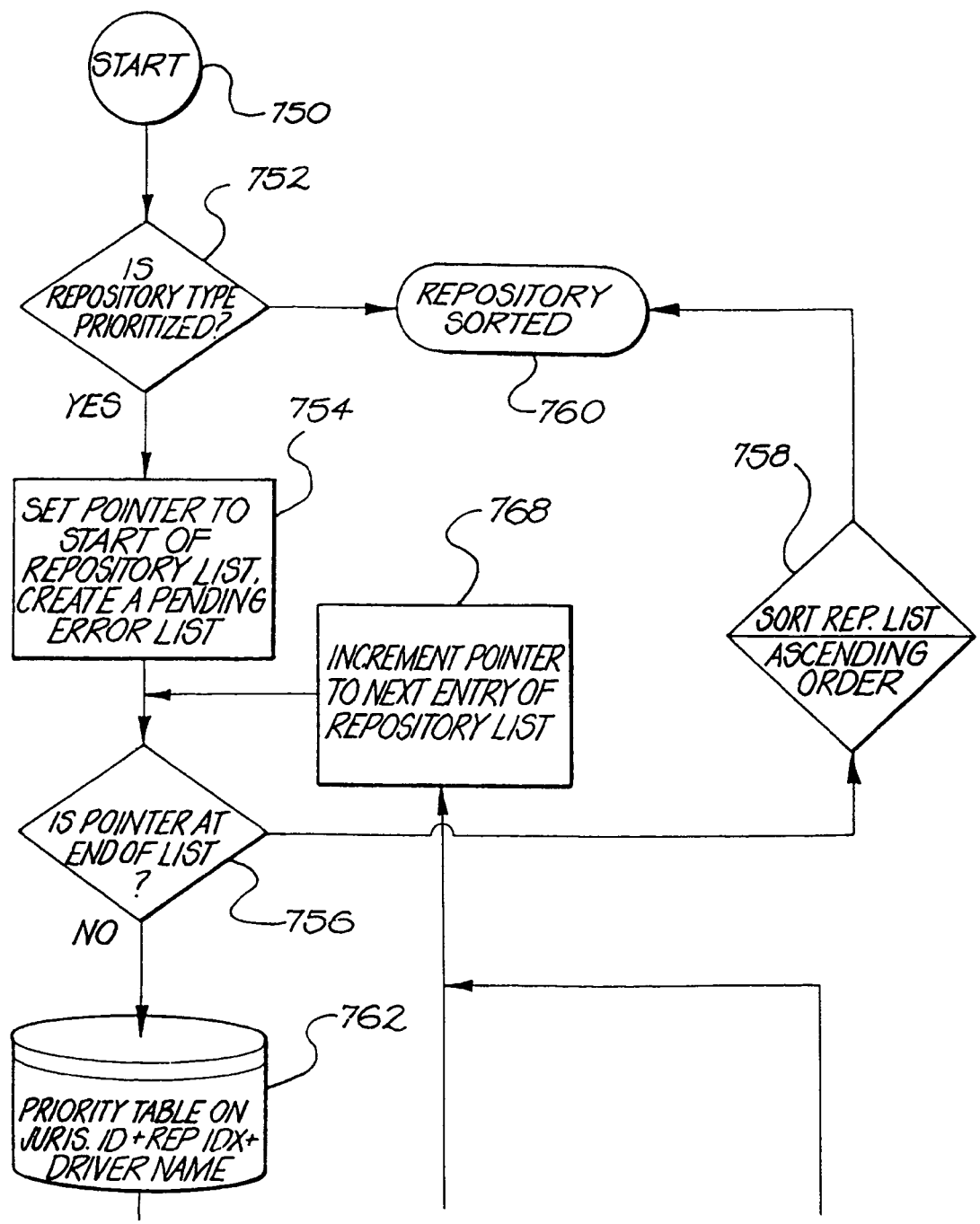
Figure 5D:
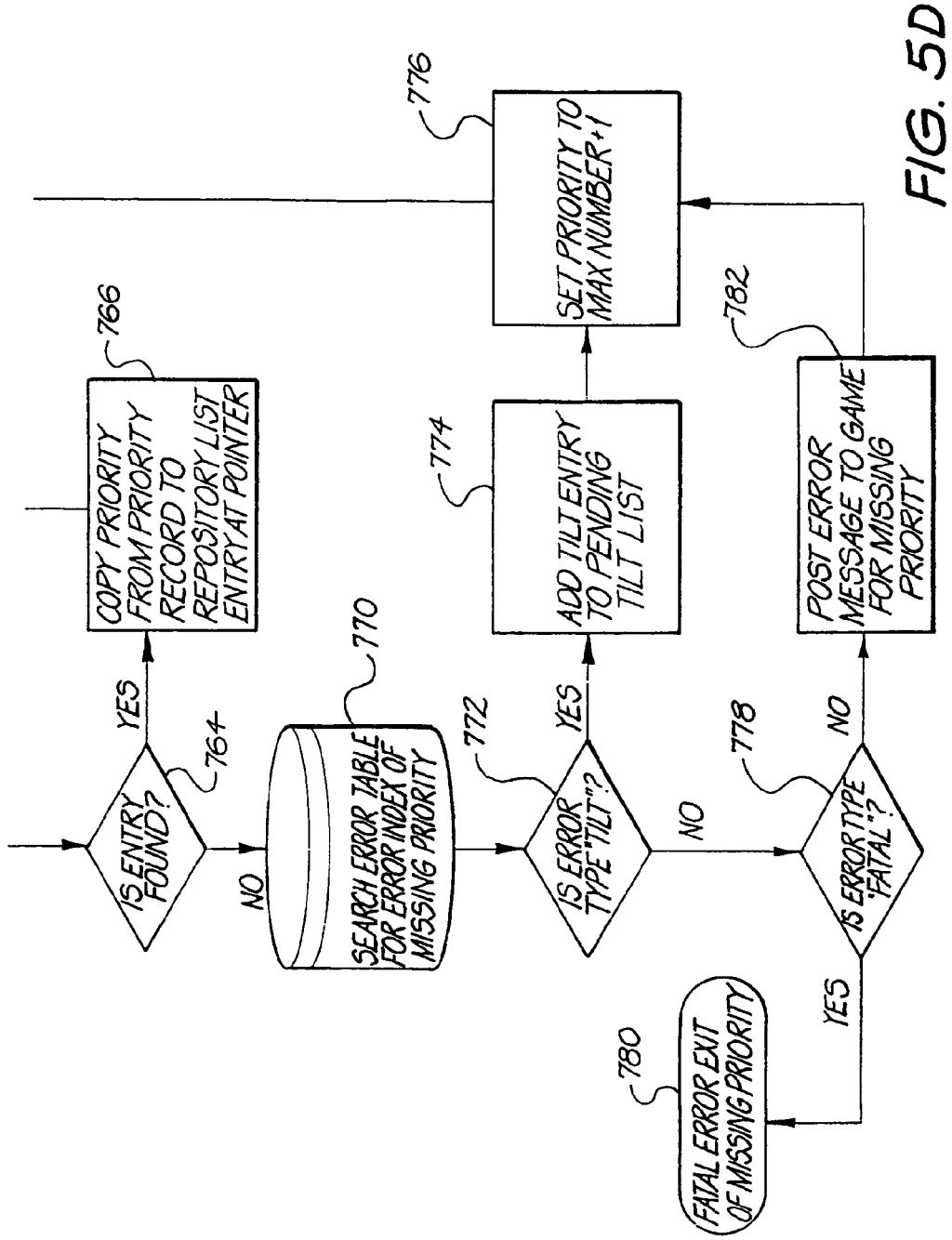

The resource manager control task 20 then checks the configuration of additional IOCBs if present. Since there can be as many as two additional IOCBs installed in the game, the configuration block has an address field for each of these entries is an I/O address from 0C10 hex to 0D00 hex. A secondary IOCB entry must be addressed beyond the primary IOCB's 110 address, but not necessarily contiguously. The tertiary IOCB entry must be addressed beyond the secondary IOCB address, which in turn, must be beyond the primary IOCB address. The verification of the address of the secondary and tertiary IOCBs is performed as shown in FIG. 3 at 454 through 468. If the entries are not in order (at 456) and beyond the primary IOCB address, the resource manager control task 20 will issue a tilt message at 466 saying that the data for the secondary IOCB in the configuration data are invalid. This is not a fatal error and the resource manager control task can proceed to allow the operator override the tilt to continue (not shown). If there are one or two entries for secondary IOCBs and they are both valid (i.e., in order), then the resource manager control task will start an extra I/O communication driver for each entry at the given address. The newly initiated I/O communication drivers for the primary or secondary IOCB will not automatically scan for the presence of IOCBs. The I/O Comm drivers will use the addresses given in the config block. They will only check for IOCB's at that address.

If the I/O communication driver 30 cannot establish communication with an IOCB at the address passed to it the resource manager control task 70 will issue a tilt message stating which secondary IOCB address entries in the primary configuration data are in error and then allow the operation to override the tilt to continue. At this point, resource manager control task 70 can do no further error checking on the primary configuration data. The remainder of the error check for configuration is under the control of another gaming system task which manages the NV (non-volatile) storage for the game software. The NV storage task is at a higher level from the patent consideration.

FATAL TILT is a catastrophic event that results from broken hardware, corrupted software, illegal hardware or illegal software that requires manual correction and/or reinitialization. The casino operator would have to open the game up, or pull it off the floor.

The game must stay in FATAL TILT until corrected by the casino operator. This is a known feature in gaming "art".

The resource manager control task 20 now sends the section of the configuration block that details the NV storage location to the gaming software. The resource manager control task now waits for the NV storage task to be started up by the game software. After the resource manager used the configuration data to find the game's primary and any redundant NV storage, the game software starts the NV storage task. If the NV storage task starts without errors, the Resource Manager Control Task 20 must now request the NV storage set for the resource manager be attached to the Resource Manager Control Task 20. This NV storage set has the records of resource manager settings and lists of the game prior to the gaming machine being powered down (i.e., shut off).

The NV storage set attached to the resource manager 20 contains information on the hardware types, their identifications (IDs) and status that were connected to the IOCB 120 before the last power down, and the software revision, their identifications, levels of the resource manager and device drivers. This information allows the resource manager to inform the system when hardware or software has been changed. The resource manager control task 20 now starts the Low Level Driver Manager 40 after the NV storage set has been attached. The operations of the Low Level Drive Manager 40 are illustrated in FIG. 4. The NV storage set also has a CRC signature which is checked to insure the data is valid. The CRC signature for the NV storage is verified by the resource manager control task 20 in a manner similar to that shown in FIG. 2b for the other system hardware. If the CRC value isn't valid, a jurisdiction based warning message is issued.

As shown in FIG. 4 at 550, the NV storage set is either cleared (i.e., declared valid) or not cleared, as shown at 550, the Low Level Driver Manager 40 then issues an error message which is either a "WARNING," a "TILT" or "FATAL". In all cases, where the NV storage set is determined to be invalid, the resource manager 20 will not be able to inform the game system that change from previous hardware connected to the system has been made. In the case of valid NV storage, the resource manager 20 is able to inform the game system of a hardware change since the system was last powered off.

The next functional block of the resource manager is the low level driver manager 40. The low level driver manager requests the IOCB device information. This information contains the IOCB's type, revision level, and serial number. This information is compared to what is stored in the NV storage set, and, if it's different from the information previously stored, a message about the change is sent to the game software log and the NV storage set is updated with the new IOCB device information. The low level device manager then sends a request through the I/O communication driver 30 to the IOCB 120 for the list of attached hardware devices.

The low level driver manager 40 uses this list to load drivers at 500 from the low level driver pool. (See FIG. 4.) Each attached hardware type is sent from the IOCB 120 through the I/O communication driver to the low level driver manager 30. The manager checks the driver pool hardware index and table which is built with the current jurisdiction, known hardware types, plus hardware revision levels. (See FIG. 4b for diagram of configuration tables and indexes available). Maintaining a listing of the hardware revision levels in hardware index (FIG. 4) is necessary because hardware and software changes to fix problems or add features are never uniformly installed in equipment out in the field.

For known hardware at 516, the hardware index will point to one of the following:
(1) a valid hardware driver in the pool;
(2) an entry named "IGNORE", meaning that the hardware should be ignored for this jurisdiction, but not error message sent;
(3) an entry named "WARNING," meaning ignore the hardware, but post a warning message;
(4) an entry named "TILT," meaning send a message, lockup the game, but allow an operator override; or
(5) an entry named "FATAL," meaning post an error message and lockup the game. (See FIG. 4, at 534-536).

If any entry for the hardware is not in the hardware index (at 518), or the revision level does not match any of the drivers, the hardware type is unknown, and, according to the action table 528 for the jurisdiction error table at 393-545, built into the low level driver manager, the game could:
(1) ignore it;
(2) post a "WARNING" message;
(3) post a "TILT" message and lockup with the operator allowed to override; or
(4) post a "FATAL" message and lockup the game (FIG. 4, at 534-536).

The hardware processing steps for each hardware item are illustrated in FIG. 4, with FIG. 4 summarizing the information and error messages that are issued in response to actions taken in FIG. 4. As each entry on the list of attached hardware device is processed, the low level driver manager 40 builds a new list at 532 from the attached hardware list containing fields for:

(1) the action taken by the low level driver manager, and if a driver was loaded;
(2) the driver information and the hardware information obtained from the hardware.

This information will have revision levels of the software and the serial numbers of each hardware item. If at any point in the processing of the list of attached hardware, a "TILT" type message is issued (at 522, FIG. 4), it will pend until all the hardware entries have been processed (524). All other types of message actions are executed as they occur, thus the "IGNORE" and "WARNING" messages which are not critical to the operation of the system are issued in real-time. Similarly, a "FATAL" message to lock up the game is sent immediately upon its occurrence (536). If at the end of processing the list of attached hardware there have been no "FATAL" tilts, the low level driver manager posts any pending "TILT" lockup message and waits for operator override (FIG. 4, at 538). If there are no tilts pending, the low level driver 40 manager will start comparing the generated driver/hardware list with the list of the previously loaded drivers keep in the NV storage set (see FIG. 4), starting at 603.

The comparison process in FIG. 4 is done to find what hardware, if any, has changed since the last power down. The low level driver manager starts at the beginning of the new list at 604 created as attached hardware devices were processed. If the entry was deemed to be invalid or an "IGNORE" error message issued, the low level driver manager will send a message for that reported hardware type to the game system maintenance log informing it what action was taken. If the hardware entry had a valid driver loaded, the old list in NV storage is scanned for any matching entries at 604 through 630. The serial number of the hardware must be the same between the new and old list of entries, or—if it is a hardware device that doesn't have a serial number—the hardware type, revision and lack of serial number must match that information in NV storage at 628. If there is a match at 628, but the revision of the hardware or driver changed 636, the low level manager will report the change to the game system maintenance log and remove the old entry from the old list. (FIG. 4, at 606-636). If the match was exact, no report is made, but the entry is removed from the old list at 636. If there is no match, a report is made to the game system maintenance log that there is a new hardware device and the report will include all of the information in the attached hardware entry. After all the entries in the new list are finished being process, all the entries remaining in the old list are reported as removed to the game system maintenance log. The last step shown at 610 is to move the new list to the old list in the NV storage set, at which point (612), the hardware comparison and updating of the low level driver system is complete. For those hardware items which do not have a serial number, information as to the hardware type, revision, and absence of a serial number are recorded in NV memory for use later.

The resource manager control task 20 next loads the High Level Driver Manager 50. In addition to the jurisdiction error table 550 that the low level driver manager contains, the high level driver manager also has two extra tables. These are the "Repository" (FIG. 4 at 570) and the "Load" table 599. The Repository table 510 converts the repository name to a known index (572) and, at 574, indicates whether the repository type is prioritized, general or unknown. An unknown repository type means the system has no knowledge of the repository name, in question. The Load table is a table of high level drivers, both software and hardware, that should be loaded on creation of a repository, indexed on jurisdiction and repository. (FIG. 4, at 599-601).

The Driver Pool associated with the high level driver manager (see FIGS. 1, 50, 60, 80, 90 and 100) also has a "Hardware" index and table (FIG. 4, at 596). The high level driver pool hardware index is based upon jurisdiction, hardware type, high level driver name, and low level hardware revision as shown at 597 and 598. This index will point into a table of high level driver revisions that match the hardware revision level. The high level hardware driver table 596 contains an alternate software driver in 598 that is used if a matching low level hardware driver is unavailable. The alternate software driver could link to other hardware drivers to provide a software alternative to call other hardware, software to simulate the missing hardware, or it could serve a shell function and have the repository control task 20 continue and search for the next driver. If there is no entry in the index for the existing hardware revision, or the entry points to an "IGNORE," "WARNING," "TILT" or "FATAL" entry in the table then there is no matching high level driver for the low level driver hardware.

The high level driver pool 60 has a third index and table named "Priority" (FIG. 4, at 580). This table uses an index 582 built from jurisdiction, repository and driver name. The priority index places all the software and hardware drivers in hierarchical order for each jurisdiction and repository, but only for Prioritized repositories. While the I/O communication driver 30 and low level driver manager 40 are loading, the game software continues to load the rest of the game tasks. The high level driver manager 50, once loaded, waits for these repository control tasks to request the resource manager 20 to create their repositories starting at 700. (See FIG. 5.) When a creation request for a repository comes in, at 702, the high level driver manager first looks to determine what type of repository it is, using the "Repository" table at 704. If at 706 the repository was not found in the table, the high level driver manager marks it unknown at 718. If, at 708 the repository is known to the system, the high level driver manager keeps track of the repositories' type and index as shown in 708 and succeeding steps. For general and prioritized repositories, the high level driver manager will create a repository list that will contain all the drivers loaded. The list will also provide information on the revision level of the driver, whether it is a hardware or software driver and the priority of the driver. For hardware drivers, the hardware type, the hardware revision and the alternative driver entry from the hardware table will also be loaded into the repository list. For an unknown type, the high level driver manager creates a blank repository list and informs the repository controlling task that the repository is of a type unknown at 718, and at 720 the high level driver manager has completed the repository creation. The repository task then has the burden of requesting drivers to be loaded; and if they need to be prioritized, the repository task will also have to do the prioritization. The steps of establishing the priority of the various drivers is shown in FIG. 5, from 752 through 780. If the repository type is known, the high level driver manager then uses the Load table with the current jurisdiction and repository index set to the beginning, to start adding drivers.

The high level driver manager has received the current driver name and at 716 (FIG. 5) queries in the high level hardware driver pool jurisdiction index 597 to see if its allowed at 728. If the driver is not found in the hardware table at 726-754, the repository control task is informed and the high level driver manager looks in the jurisdiction error table 560 for the not found error to see if the action it should take is to:

(1) "IGNORE" it;
(2) post a "WARNING;"
(3) post a "TILT" message and allow the operator to override; or
(4) post a "FATAL" message and lockup in a manner similar to that previously described for the low level driver manager.

All tilt message posts will pend until the resource manager is informed that all repositories are created. Other action types are executed as they occur.

If the found driver in the high level driver pool is allowed (at 726) for the jurisdiction, and it is a hardware driver, the high level driver manager scans the loaded low level drivers for hardware of the same type at 728. If the high level hardware driver matches a low level driver hardware type at 730, then at 732, the high level driver manager checks the revision of the hardware and high level driver name to see if there is a matching high level driver revision in the hardware index. If there is no matching low level driver loaded, the alternate software driver is loaded at 740. If no high level driver is found at 716, the high level driver manager checks the Error table 560 for error type and informs the repository control task of the mismatched hardware revisions at 746. If the hardware table indexes 597 (FIG. 4) didn't point to an action type, the high level driver manager checks the jurisdiction error table 560 to see what action should be taken. If there have been no problems up to this point, the actual level driver is loaded at 730. If the driver being loaded is a hardware driver, the high level driver manager will pass the driver the information to allow the high level driver the interactions shown between the low level drivers 42, 44, 46 and 48 with high level drivers, such as 42-52, 44-54) to make a connection to the corresponding low level driver. After being loaded, the driver will run internal compatibility checks as needed. An example of a possible check is one piece of hardware needing another piece of hardware to be present for the first to work properly. If during the checking process, any items the first driver requires are missing or incompatible, the driver will return either a missing hardware error, or a revision error code for incompatibility problems, to the high level driver manager and exit. If the high level driver manager will execute the same action for the second piece of hardware, as in the revision error case. The driver error reports could be delayed until all repositories are created and loaded. After loading a hardware driver, the high level driver manager would continue to scan the low level drivers for hardware of the same type. If the high level driver manager finds another low level driver of the same hardware type, it will go through the load process described above and load another high level driver to communicate with the additional low level driver. The high level driver manager continues this scanning process until it has scanned all of the low level drivers. Low level drivers 70 can only know the existence of and communicate with the I/O communication driver 130 and the low level driver manager 40 (FIG. 1.), the low level drivers are programmed so as not to be aware of other drivers or tasks running. High level drivers can be programmed to know if other high and low level drivers are loaded. No driver should know about the internal workings of any other driver. If drivers have knowledge of internal functions of other drivers, the software is hard to maintain or update. High level drivers can communicate with loaded low level drivers, the high level driver manager, other loaded high level drivers in all the repositories and system level tasks in the case of software drivers, as shown in FIG. 1.

This visibility of other drivers can be used for drivers in prioritized repositories to change the order of execution in a prioritized repository as needed, and in the case of general and unknown repositories, actually call other drivers as needed after they themselves were called by the repository control task or other drivers. As each default driver load is completed for a repository, and there have been no errors that could cause the system to halt, the high level driver manager will put the drivers in order if the repository is of the type prioritized. (See FIG. 5.)

In the repository list the high level driver manager made as it loaded each driver in the prioritized repository, there is a field for priority (reference numbers 580-584, FIG. 4.). This priority field at 584 is simply a number from one to the maximum number of drivers in any repository. The driver pool for the high level driver manager has a table and index, named "Priority", built of jurisdiction, Prioritized repository index (based on the repository name) and the driver name. This index points to entries numbered from one to the maximum number of drivers possible. The high level driver manager starting at 750-762 (FIG. 5) uses this index to scan the repository list and fills in the priority field with the number from the index. If during any of the scans, the index search is missing an entry at 764, 770, for that jurisdiction/repository/driver combination, the high level manager looks in the jurisdiction error table at 770 for the action on this type of error. If there are no serious errors, (778) as defined by the jurisdiction error table, the high level driver manager then does a sort on the repository list based on the priority field at 758. If there are several of the same hardware drivers loaded, because of several occurrences of the same type of hardware, as part of the gaming device, the priority field in the list would be the same and the high level driver manager would request these drivers to order themselves. The multiple high level hardware drivers do this based on internal configuration data received from the hardware. For example, if drivers for two hoppers are loaded, the driver for the coin hopper having the higher denomination coins would be ordered in the list before driver for the coin hopper for coins having the lower denomination. Now that the repository list is ordered, or the repository is not a "priority" type, the high level driver manager informs the repository control task that the repository creation is complete. The repository control task then reads the repository list, and can request drivers to be loaded, unloaded, or the order changed. Usually, the repository control task will not need to make any changes. Any repository task requested changes are treated just like loading a driver during the default load (See FIGS. 4 and 5). If there are any errors, the same handling would occur. Once the repository control task has made all the necessary changes, and there have been no errors that would halt the system, the repository control task informs the high level driver manager that the repository is complete with respect to the repository control task. At this point, any alternate software drivers loaded in the repository will run checks to see if the missing hardware driver was needed for proper operation of the repository. If the hardware is not needed, the alternate driver could need to re-prioritize the repository or do nothing. If the hardware was needed, the alternate driver will inform the high level driver manager. The high level driver manager now compares the current repository driver list to the previous driver list stored in the NV storage set, but only if the resource manager and game software revision levels are the same as previously recorded (i.e., prior to the last power down) in the NV storage set. This process is similar to what the low level driver manager process did FIG. 4. After any new, missing, or changed high level drivers have been reported, the high level driver manager has completed the repository list creation and the new repository list is stored in the NV storage set in place of the old repository list. After all the repositories have been built, the game software informs the resource manager control task that there are no more repositories pending and the resource manager is now completely loaded and operational.

While powered up and operational, new hardware may be added, or current hardware may be removed without affecting the gaming software. The hardware abstraction specified in NuGame's Patent Application Ser. No. 60/094,068, for I/O Interface and Device Abstraction Patent, filed 24 Jul., 1998, allows hardware to be hot-swapped (removed or added without turning power off). As hardware is removed or added, the IOCB 120 sends a removal or added message to the I/O Communication driver 30. The low level driver manager 40 is notified and it first checks the jurisdiction error table to see if the game is allowed to hot-swap hardware. The action specified is taken and, if it is "IGNORE" or "WARNING", the low level driver manager 40 will process the notification. For a notification that hardware has been added, the low level driver will go through the driver loaded process as described above and flowchart in FIG. 4.

If there are no errors of a type "TILT" or "FATAL" and a driver was loaded (FIG. 4 at 520, 532, 530), the low level driver manager then informs the high level driver manager of the newly loaded hardware type and hardware revision. The high level driver manager then scans the hardware index for an index that matches the jurisdiction, hardware type, and low level hardware revision. The index that matches those three parts points to the high level driver to be loaded. If no high level driver is found, the high level driver manager looks in the jurisdiction error table at the "hot-swap" error index of the error table at 560 through 564 for the error action to take. If the high level driver entry was found in the hardware table, the high level manager then uses the alternate driver name to scan all of the repository lists (shown generally in FIG. 5, from 704 through 740). Since this is new hardware, any of the repositories that would have needed it loaded would have had to load the alternate driver on power up. For every match of the alternative driver the high level driver manager finds in the repository lists, the actual hardware driver will be loaded. Once all the repositories have been scanned, the high level driver manager informs the repository control tasks that had changes made in their repository lists that they need to rescan their list. The high level driver manager logs the "new hardware added" message to the game system log. The high level driver manager then saves all the changed repository lists to the NV storage set.

Figure 6A:
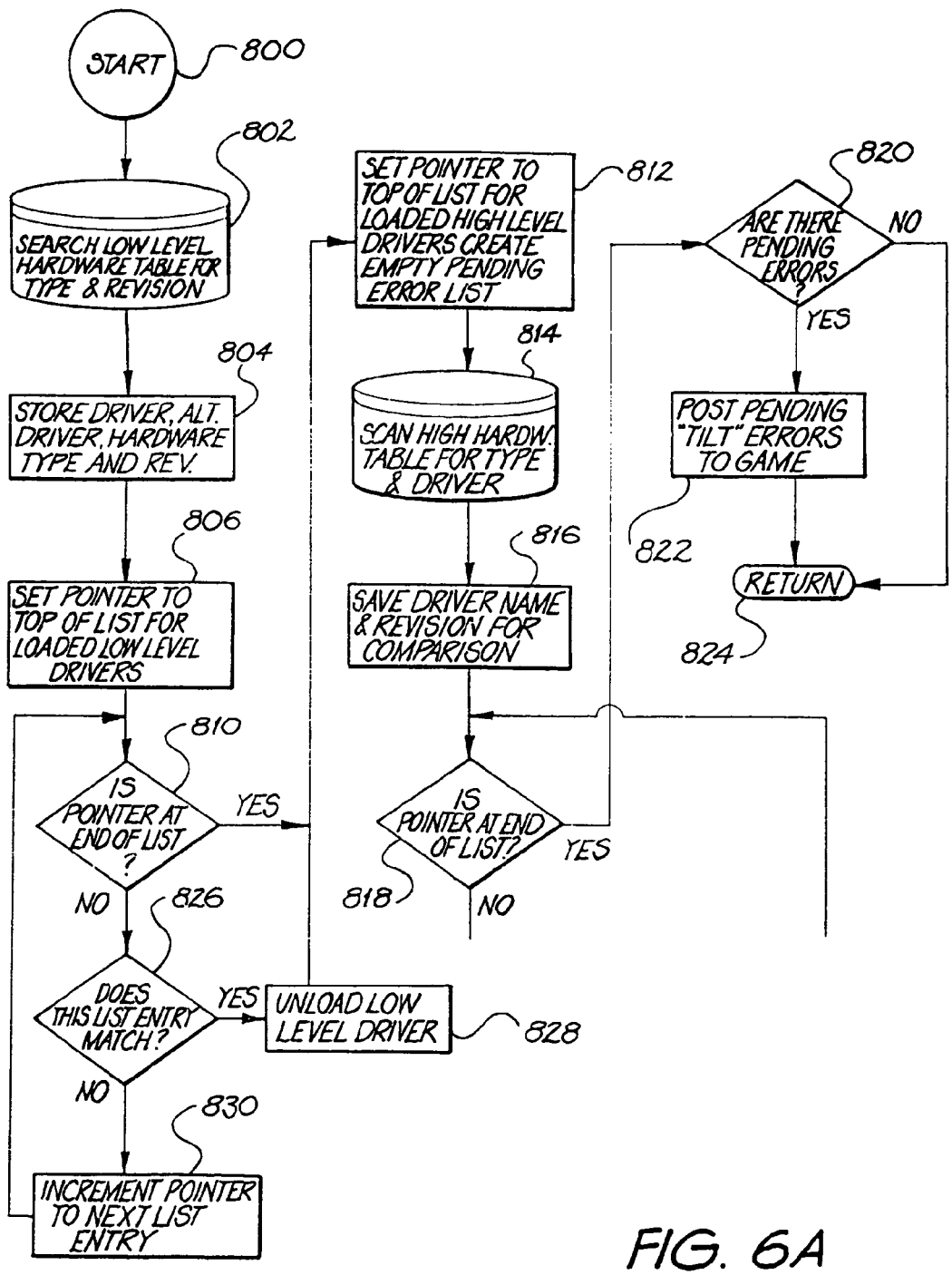
FIGS. 6A and 6B (collectively, "FIG. 6") is a flowchart of a hardware removal message being processed.
Figure 6B:
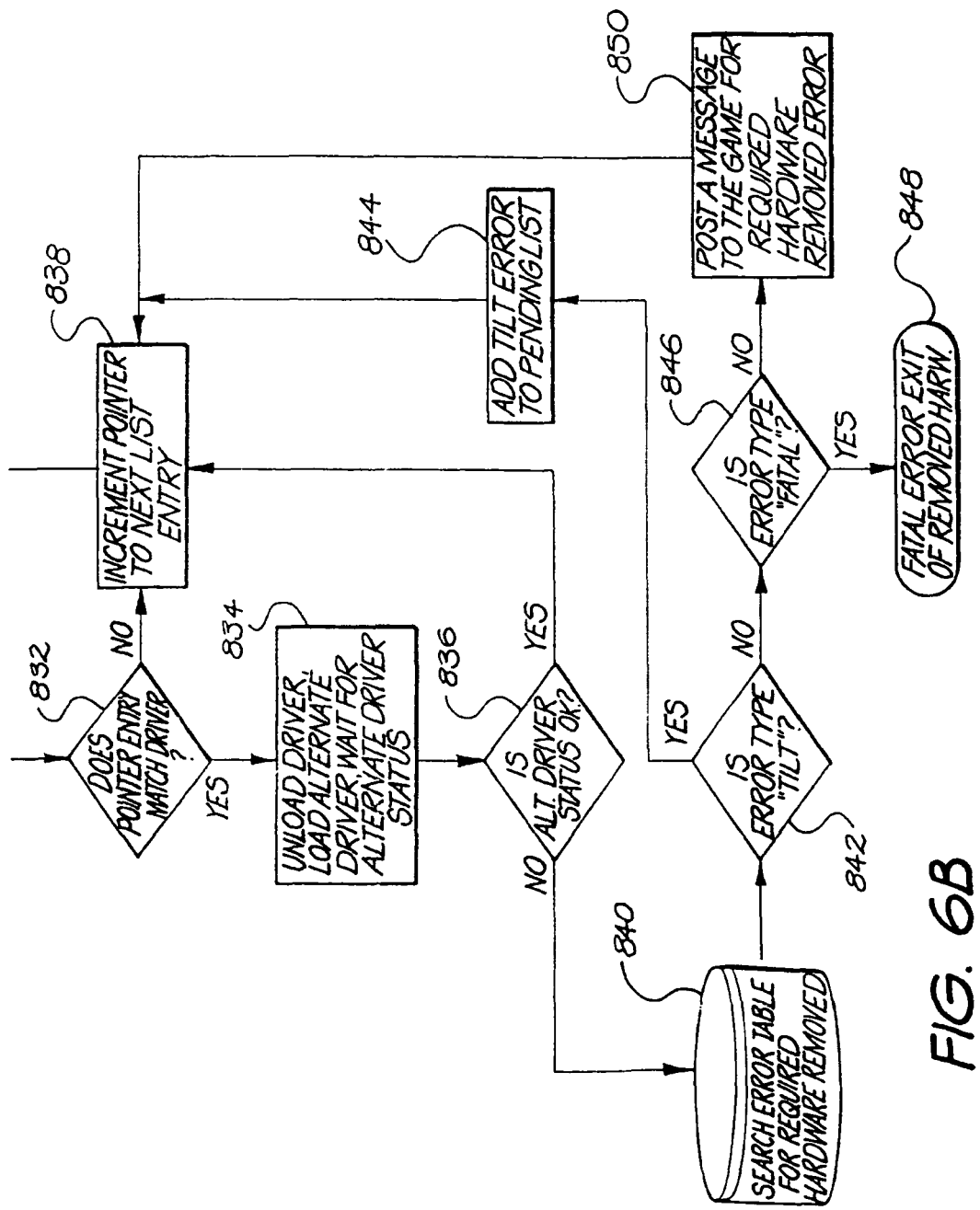

As shown in FIG. 6, hardware removal works a little differently than the previous example and the power up case. (See FIG. 6). The message from the IOCB 120 that a hardware device has been removed is delivered to the I/O communication driver 30. The I/O communication driver 30 sends the removal notification to the low level driver manager 40. The low level driver manager 40 removes the low level driver that matches the hardware type and revision and then sends the removal notification to the high level driver manager 50 (FIG. 1). Using the hardware type and revision in the message, the high level managers at 802 (FIG. 6) scans all the repository lists for matching hardware types and revisions. For each match, the repository list will have listed the alternate software driver for that high level hardware driver. The hardware driver is unloaded at 828 and the alternate driver is loaded at 834. If hardware was required for this jurisdiction at 836, the alternate driver will inform the high level driver manager. Looking in the jurisdiction error table 840, the high level manager will see what action to take for a required hardware device being removed. All "TILT" actions will pend until all the repository lists have been scanned. If the action is not a "FATAL" tilt lockup, (such as at 848) the high level driver manager continues to scan all the repository lists. After all the lists have been scanned the alternate drivers that were loaded are informed, and they in turn run their checks. The alternate driver may inform the high level driver manager that the hardware is required, in which case the high level driver manager at 850 sends a missing hardware message to the game system, or the software driver may re-prioritize the lists. Once the software drivers report everything is okay at 836, the high level driver manager informs the repository control tasks to re-scan their repository lists. The high level driver manager reports the new hardware to the game system log and then saves the changed repository lists to the NV storage set processing is complete, and at 824 the resource manager is operational again.

Some examples of the gaming device's resource repository function types, but not limited to these, are: pay, collect, multi-player and game interface (such as buttons, reels, bonus hoppers, lights, towers, meters, jackpot bells, etc.). To see how the repository control task uses the repository drivers, use of the pay and game interface repositories will be given as examples. The first two examples are of the pay prioritized repository (FIG. 7), and the last example is of the game interface general repository (FIG. 8).

The repository control tasks call the drivers in their repositories to process or control objects in the repository. The repository control tasks for prioritized repositories need very little extra intelligence, since the high level driver manager will load the needed drivers for the control task to handle their duties. The drivers loaded by the high level manager are the default drivers for the whole game. This software is designed as a multi-game platform, meaning the player chooses which game to play. If the chosen game has an unusual feature or way to use the hardware that differs from default, it will have to ask for other drivers to be loaded or unloaded. The repository control tasks will need extra intelligence when specialty games are loaded that require non-standard usage of the hardware. Non-standard usage would be usage other than the default hardware usage by most games. General and unknown repository control tasks must have intelligence built into them to request needed drivers if they have not been loaded. General and unknown repository control tasks must know which drivers to call in order to handle different operations on the different repository objects at 902. In all cases, at 908, the repository control task calls a driver, passing it an object message for the driver to operate on. When called by a repository control task, a driver could:

(1) do nothing and return the object unchanged with a control message (at 910, 914, 918), to the control task, to call the next driver;
(2) partially process the message, call another driver with the changed message, return the changed message with a control message to call the next driver, return the changed message with a control message to call a specified driver (910, 914, 916);
(3) process the whole message, returning a processed object message with control message that the processing is complete at 913.

Given these factors the pay repository is a prioritized repository. It has the following drivers loaded in order:
(1) lockup;
(2) credit;
(3) hopper: and
(4) call attendant.

For example, assume that a game is won, resulting in the payment of 80 credits, the following pay routine will try to distribute the pay according to the actions of the high level drivers it calls. The pay repository control task starts with lockup, the first driver entry in the prioritized repository list. The pay repository control task sends lockup a pay message object having the value of 80 credits in it. Lockup looks at the value, of 80 credits and converts it to dollars to compare it against the lockup limit for the current jurisdiction. If 80 credits is less than the lockup limit, the lockup software driver returns the message unchanged to the pay repository task with 80 credits still in it and a control message for the pay repository task to go to the next priority driver. The pay task sends a pay message with 80 credits to the credit software driver. The credit software driver checks to see if the current number of credits plus the 80 credits in the pay message object would put it over the limit for the credit meter. If it is okay, the credit driver adds 80 credits to the paid meter and the credit meter. The credit driver then returns a pay (i.e., no more credits to process) message object with zero credits left and a control message for pay complete.

Figure 7A:
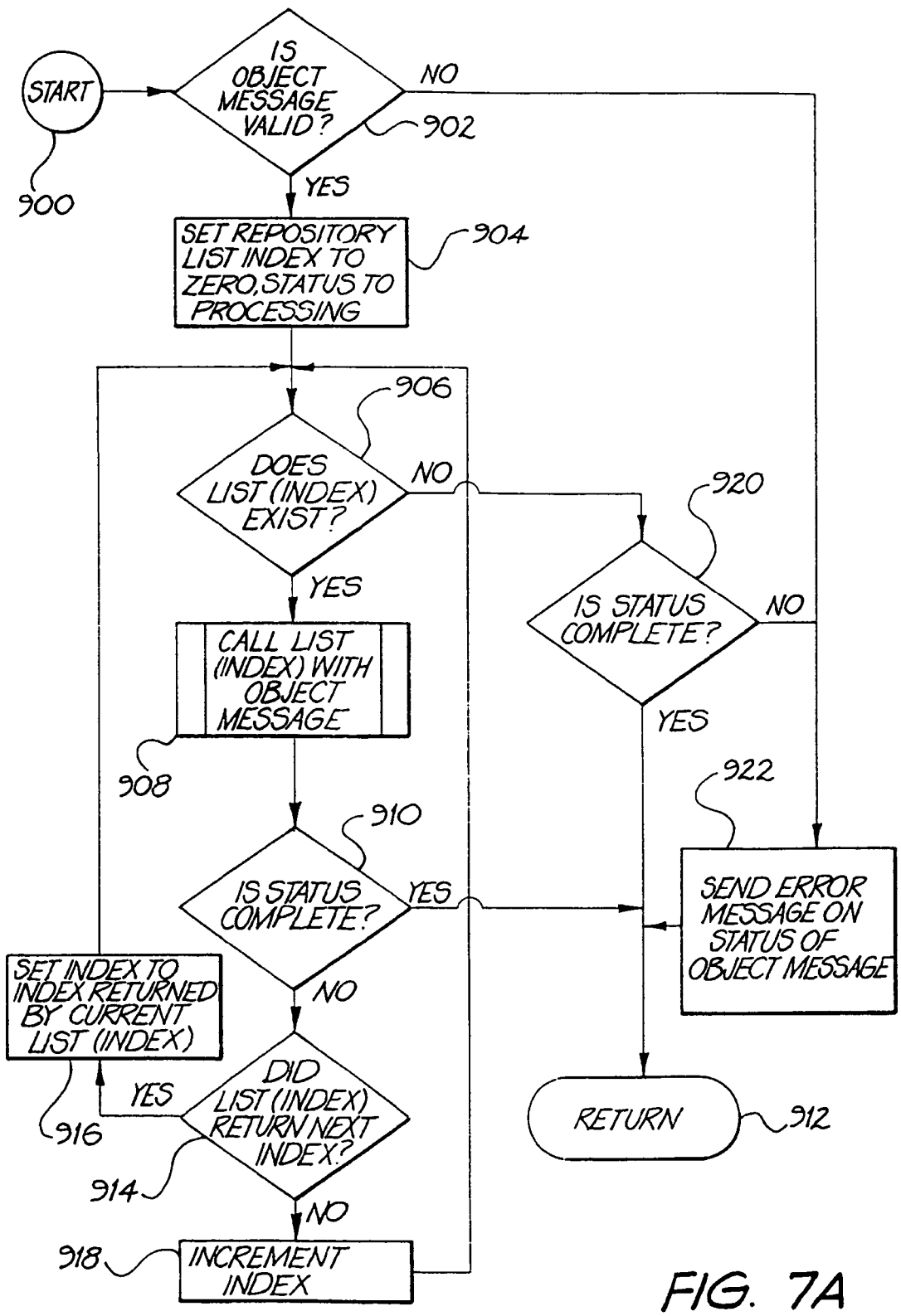
FIGS. 7A and 7B (collectively, "FIG. 7") is a general flowchart of a prioritized repository processing an object.
Figure 7B:
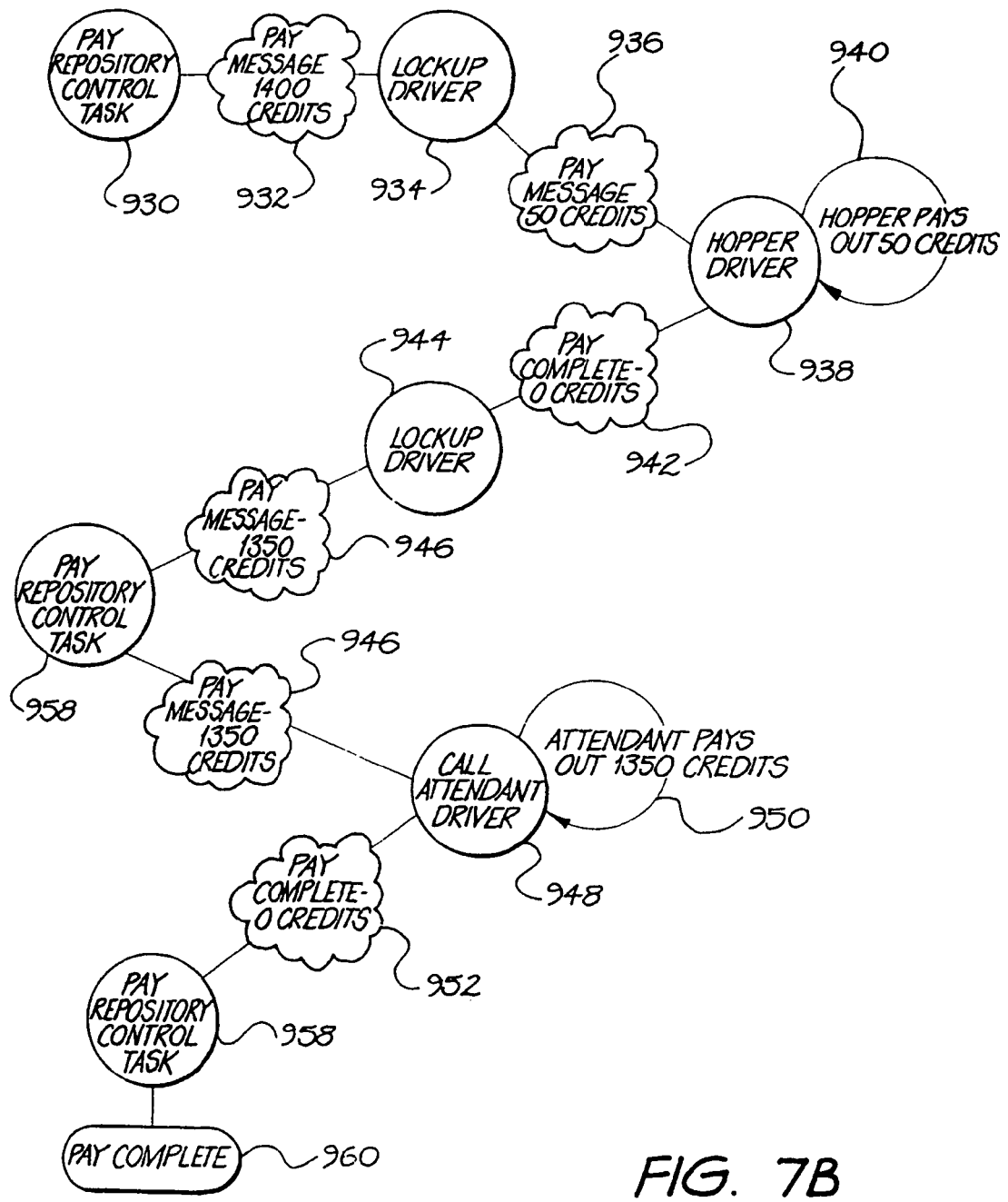
Figure 8A:
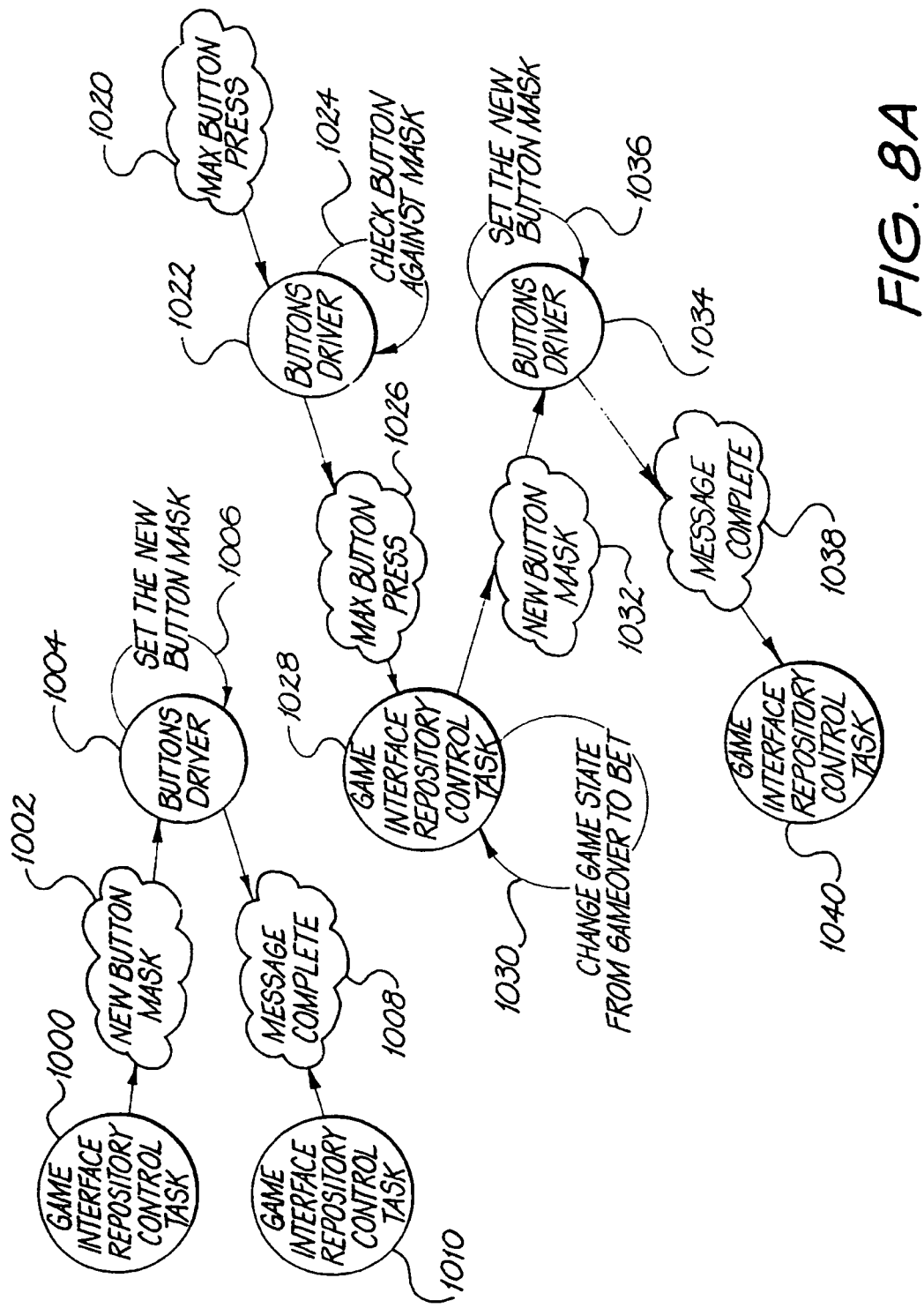
FIGS. 8A and 8B (collectively, "FIG. 8") is a message flow diagram of the game interface repository control task example.
Figure 8B:
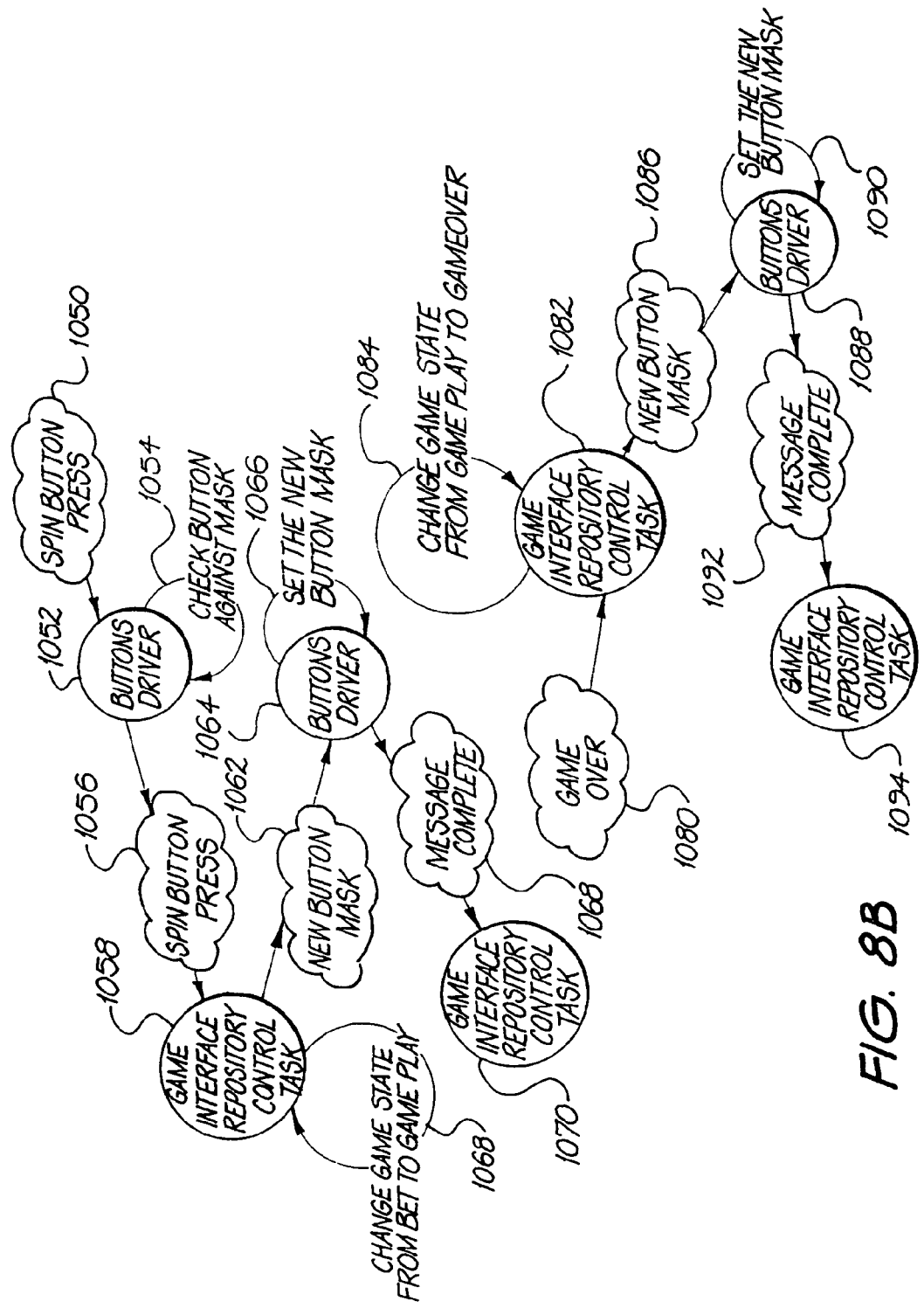

As another example, assume a game win of 1400 credits (See FIG. 7). The pay routine 930 sends a pay message 932 object to the lockup driver with a value of 1400 credits. The lockup driver logic decides to hand pay the 1400 credits, but have part of it paid from the hopper, so the player has some money to play the neighboring game while waiting for the attendant to hand pay the remainder (936). The lockup driver at 934 calls the hopper driver at 938, as if it were the pay control task, with a pay message object of 50 credits 936. The hopper driver pays out the 50 credits at 940 from the hopper hardware, updating the paid meter, and returns a pay message at 942 with zero credits left and a control message for pay complete to the lockup driver at 944. The lockup driver at 944 returns a pay message object of 1350 credits at 946, and a control message for the pay repository control task to go to the call attendant driver next. The pay control task 958 sends a pay message object 946 of 1350 credits to the call attendant driver 948. The call attendant driver eventually hand pays the 1350 credits, updating the paid meter at 950 and returns a pay message with zero credits left at 952 and a control message for pay complete at 958. Notice that the call to the hopper at 938 was from the lockup driver, so when the control message from the hopper saying pay complete was passed back, it was to the lockup driver at 944 and not the pay repository control task. Otherwise, the pay control task would have had to reconcile the fact that credits are left while a driver says the pay function is complete. All repository control tasks should have logic to catch this incomplete message processing. If the control task finds that the message object is still not completely processed, while the driver informs the control task that the task is complete, the repository control task should send a request for jurisdiction lookup to the high level driver manager for whether the tilt in the current jurisdiction is a warning tilt that allows operator override or a fatal tilt that locks up the game. If the tilt action returned from the high level driver manager's lookup in the jurisdiction error table is not either of those two error actions, the repository control task will default to a fatal tilt lockup.

The game interface repository has many different types of objects. The following example will deal with only two drivers: (1) the buttons and (2) reels drivers. Whenever a game is loaded for play, whether selected by the player, or loaded as the system configured game, the first thing the game does is to make sure that the hardware is available for the game to be playable. In our example, a reel game is loaded.

The gaming software reads the game interface repository list to make sure that the reels driver for the reel hardware is there and deck buttons are available by checking the buttons driver. The game software, using the game interface repository control task, then queries the configuration of the reels and buttons drivers. If the reel configuration does not match the needs of the game specified by the gaming software, such as number of reels number of stops per reel, and loaded reel strip symbols, the gaming software will have to declare an error. This level of error will not be decided by the high level driver manager's jurisdiction error table, but by the game software itself. The game software also asks for the buttons configuration. If the deck buttons installed do not have the right layout, number, or labels, to match the game needs, the game software will have to declare an error. If there are no errors, the game software then sends the reels driver a configuration message with the default spin direction, stop order, and starting position. These defaults are attributes of the reels driver object type. Spin direction would be up or down. Stop order would be which reels stop before other reels can stop, e.g. reel one, then reel two and then reel three, or all stop as soon as possible. The starting positions are the symbol positions that should be showing on each reel as recorded for the previous game in NV storage. The reel driver spins the reels to the starting positions. As each reel stops, the reel driver sends a reel stop message, indicating reel number and stop position, to the game interface repository control task. These messages allows the game software to verify that the stop positions and stop order are set correctly.

The configuration of the game buttons varies. The game software sends a configuration message to the buttons driver. The buttons driver that has a mask reserving buttons for game use only, a mask for buttons that can be used by the state machine software, a mask for buttons that cannot be used at all, and a mask for which buttons the game will accept inputs from currently. The input mask changes as the game proceeds from state to state, e.g. game over, to bet, to game play, to pay state and back to game over. The buttons driver sends a message copy of these masks to the lamps driver, so it will know which button lamps can be turned on, which button lamps must always be off, and which lamps to turn on currently. Unless the game needs to use special handling of the lamps, such as flashing, the lamps driver is not accessed directly by the game; the game will depend on the buttons driver to link to and control the lamps driver. As button presses are sent up by the hardware, the buttons driver will mask out the buttons that are not wanted by the games and only send button messages to the game interface control task for buttons in the input mask (see FIG. 8, 1000-1010). Now that the game has the driver configurations set, the example will start with the game state at "GAME OVER", no rebet amount, and the game has more than maximum bet credits available. For these settings, the buttons input mask would be set to accept button input from buttons marked "bet one" and "bet maximum".

The machine at this state would have a buttons mask set for allowing the collect and change button, but these buttons would be routed to the machine and not the game. (See FIG. 8.) For a given state only certain operations, inputs, or outputs can be performed (i.e., the buttons are medal). The machine progresses through different states in a fixed fashion. As the player presses the "bet one", or "bet maximum" buttons at 1020, the game state changes from "game over" to "bet" at 1030. The game sends a new button input mask at 1032 to the buttons driver at 1034. The state machine also sends a new button mask to the buttons driver turning off all inputs to the state machine. The new input mask from the game will turn the spin button on, if "bet maximum" was not pressed. If "bet maximum" was pressed, all button inputs to the game from the buttons driver will be turned off, and the game will change to "game play" state. In the case where "bet one," "bet maximum", and "spin" buttons are lit while the gaming machine is still in the bet state, the game will change to "game play" if the spin button or "bet maximum" is pressed or the "bet one" button is pressed enough times to reach maximum bet. Now that the game is in "game play" at 1068, the button inputs are masked off and sent to the buttons driver, the game determines the random stop positions for the reels and send the "reel stop" messages with those positions to the reels driver. The game then starts playing the reel spin sound effects. As each "reel stopped" message comes back from the reels driver to the game, the game compares the stopped position with the position sent and, if they match, plays the stop sound effect. If the reel was not the last reel to be stopped, the game starts playing the reel spin sound effects again. If the stopped positions do not match, the game will declare a tilt, and the reels driver will inform any reels that are still spinning to continue to spin indefinitely. In the case there is no error, the game will evaluate the stop positions. If the stop positions a winner, the game goes to the pay state, as in the above examples; otherwise, the game goes directly to game over. After the game is over, if there are any credits left on the credit meter, the bet one button is set on in the buttons input mask. If there are enough credits available for what was bet in the previous game, and the game allows rebet, the spin button in the buttons input mask is set on. If there are enough credits available for maximum bet, the bet maximum button is set on in the buttons input mask. Now the game sends the new input mask to the button driver. That completes a game play cycle. As new devices are added to the gaming machine, the resource manager is usually the only software in the system that needs to be updated other than the added new drivers. When new drivers are added, the driver manager and drive pool indexes and tables must be updated to contain the new driver for the resource manager to understand it. (See FIG. 4 for a diagram of the tables and indexes.) If a new driver is loaded that the resource manager can't find addressed consistently in all the tables and indexes, the driver manager will look up the error action called for in the current jurisdiction in the jurisdiction error table. If none of the indexes and tables for the driver managers and pools are updated to contain the new driver, the driver managers will not be able to use the driver. If the repository control task requests the new driver be loaded, there will be an error because the new driver isn't in the table and indexes. The changes to the resource manager, when a driver is changed, are in effect, database changes. Any driver change can be considered to be one of three database transactions: (1) add; (2) change; or (3) delete. These transactions are conducted on the tables and indexes of the driver managers and driver pools. Overall, this allows hardware devices that are properly through the I/O interface to be added at will with little to no changes required in the game or resource manager software. When a new driver is developed, the additions for the driver manager and driver pool tables and indexes are bundled with the driver, in what is referred to an add package. The package has a header informing the resource manager control task that the package must be added, and whether it is a high level driver or a low level driver. The add package could have one or both of a new driver in it and/or new table and index entries. In all cases an add package would have the driver name, revision, and applied jurisdiction in it.

For an existing driver that needs to be removed, the drive name, revision and jurisdiction is bundled with the table and index entries that are to be deleted. The bundle would also have an entry for whether the driver was to be removed also and there would not necessarily be any table or index entries. This a delete package. The package has a header informing the resource manager control task whether to remove instances of the driver, as identified by revision and jurisdiction, from the high or low level pools, and if there are table and index entries, to remove them also. Any package will only affect the high level drivers or the low level drivers, never both.

A change package is a bundle containing a delete package and an add package. If all the table and index entries were okay for a driver, but the driver has a but, the change package would contain a delete of the driver from the driver pool, and an add of the new driver code to the pool. A change could also consist of only deleting old table and index entries, followed by adding new entries. For a more comprehensive change, both the driver code and table and index entries would be deleted, and then a new driver and entries added. If the storage media is write enabled, the package can be downloaded to the game software from a central computer or network server using a communications link. Based on what the current jurisdiction allows, the game software will perform some authentication to insure that the package is acceptable to use and send it to the resource manager control task. The resource manager control task will route the package to the correct high or low level driver manager which will apply the package. In the case that the storage media is read-only, a new copy of the game software would be inserted with the correct drivers, tables, and indexes during power down of the gaming machine and no packages are involved or allowed. If the resource manager software must be updated, a copy of the new resource manager can be downloaded if the storage media is write enabled. Where the new driver and resource manager is contained in a read-only copy of the updated storage media (such as CD-ROM, ROM PCMCIA, EPROM, etc.) this storage medium must be placed in the game. In the case of read-only media, the game would be powered down to make the change, and on power up, would use the new resource manager. If the new resource manager can be downloaded directly to the game, the currently executing resource manager is informed that there is a new resource manager. The old resource manager waits until the game state is between game play, and momentarily blocks game play while it loads the new resource manager in its' place. The new resource manager informs all the repository control tasks that their repositories need to be recreated. The new resource manager would then proceed as if the game had just powered up. Once the new resource manager has all the drivers loaded and the game software informs the resource manager that no more repositories are to be created, the game software also allows game play to continue.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A resource manager for use with a gaming machine configured to play a game in a jurisdiction under jurisdictional limitations provided by a regulatory agency of a jurisdiction under regulatory requirements to said game, and being capable of 1) dynamically facilitating communication between an input/output device and said gaming machine during operation of said gaming machine and 2) configuring an input/output device using said jurisdictional limitations, said resource manager comprising:
a resource manager control task serving as a command and control interface and configured to update and configure hardware and software objects, and to update and configure the resource manager;
a low level software manager loading low level software objects for available hardware based on hardware type and revision;
a high level software manager loading high level software objects from at least one repository corresponding to the low level software objects based on hardware type, software object name and low level software object revision, and prioritizing said loaded high level software objects from said at least one repository depending on said game to be loaded and said jurisdictional limitations; and
one or more software objects having a low level component and a high level component related to said input/output device; and
an error table configured to instruct said resource manager to ignore, warn about, allow or lockup said one or more software objects based on the jurisdiction.

2. The resource manager of claim 1, wherein said one or more software object comprises configuration information for said input/output device.

3. The resource manager of claim 1, wherein said one or more software object comprises at least one of a software driver and a device driver.

4. The resource manager of claim 1, wherein said resource manager configures said one or more software object to operate with said input/output device.

5. The resource manager of claim 1, wherein said resource manager comprises one or more repository grouping said one or more software object.

6. The resource manager of claim 1, wherein said resource manager comprises an interface, wherein said interface includes at least one of a Universal Serial Bus (USB) interface, an IEEE 1394 Firewire interface, and an Industry Standard Architecture (ISA) interface.

7. The resource manager of claim 1, wherein said input/output device is housed in a first gaming machine, wherein said input/output device communicates with a second input/output device in a second gaming machine.

8. A method for connecting a hardware device to a gaming system having a gaming machine configured to play a game in a jurisdiction under jurisdictional limitations provided by a regulatory agency of a jurisdiction under regulatory requirements to said game the method comprising:
scanning the gaming system for a presence of said hardware device;
determining a status of said hardware device;
issuing a command based on the status of said hardware device;
searching a repository for a software object associated with said hardware device based on the status of said hardware device, wherein said searching step comprising
searching a repository for a high level software object associated with said hardware device, and
searching for a low level software object corresponding to said high level software object for said hardware device based on the status of said hardware device,
matching said low level software object with said hardware device based on hardware type and revision;
matching said high level software object with said hardware device based on hardware type, object name, and low level software object revision;
prioritizing said high level software objects from at least one repository depending on said game to be loaded and said jurisdictional limitations; and
checking for said jurisdictional limitations relating to said software object.

9. The method of claim 8, comprising configuring said software object to operate with said hardware device.

10. The method of claim 8, comprising adding said hardware device to said gaming system.

11. The method of claim 8, comprising updating said software object based on the status of said hardware device.

12. The method of claim 8, comprising downloading said software object to configure said hardware device.

13. The method of claim 8, comprising removing said hardware device from said gaming system.

14. The method of claim 8, comprising replacing said software object with a second software object.

15. The method of claim 8, wherein said searching step comprising searching said repository for a software object based on a game selected for play by a player.

16. The resource manager of claim 1, wherein said resource manager is configured to enable communication between said gaming machine having first interface requirements and a input/output device having second interface requirements.

17. The resource manager of claim 16, wherein said first and second interface requirements both include a communication protocol.

18. The resource manager of claim 1, wherein said resource manager translates communication between said input/output device and said gaming machine into a specific format for said input/output device and accommodates drive and communication protocols.

\* \* \* \* \*